(12) United States Patent
Horne

(10) Patent No.: US 11,719,843 B2
(45) Date of Patent: Aug. 8, 2023

(54) DETERMINING A VERTICALLY TRANSVERSE ISOTROPY (VTI) ANISOTROPY ALONG A HORIZONTAL SECTION OF A WELLBORE DRILLED INTO A FORMATION

(71) Applicant: CHEVRON U.S.A. INC., San Ramon, CA (US)

(72) Inventor: Stephen Allan Horne, Haywards Heath (GB)

(73) Assignee: CHEVRON U.S.A. INC., San Ramon, CA (US)

(*) Notice: Subject to any disclaimer, the term of this patent is extended or adjusted under 35 U.S.C. 154(b) by 589 days.

(21) Appl. No.: 16/840,551

(22) Filed: Apr. 6, 2020

(65) Prior Publication Data

US 2020/0319360 A1   Oct. 8, 2020

Related U.S. Application Data

(60) Provisional application No. 62/830,988, filed on Apr. 8, 2019.

(51) Int. Cl.
  *G01V 1/50*  (2006.01)
  *G01V 1/30*  (2006.01)
  (Continued)

(52) U.S. Cl.
  CPC ............... *G01V 1/50* (2013.01); *G01V 1/306* (2013.01); *G01V 5/12* (2013.01); *G01V 11/002* (2013.01);
  (Continued)

(58) Field of Classification Search
  CPC .. G01V 1/50; G01V 1/306; G01V 5/12; G01V 11/002; G01V 2210/47; G01V 2210/626
  (Continued)

(56) References Cited

U.S. PATENT DOCUMENTS

| 8,175,807 B2 | 5/2012 | Suarez-Rivera et al. |
| 2012/0078600 A1* | 3/2012 | Horne ............... G01V 1/42 703/10 |

(Continued)

OTHER PUBLICATIONS

Chi, Shihong, et al.; "Stoneley-Wave Speed Modeling in General Anisotropic Formations"; (2006), Geophysics, vol. 71, No. 4, pp. F67-F77.

(Continued)

*Primary Examiner* — Michael P Nghiem

(57) ABSTRACT

Embodiments of determining a vertically transverse isotropy (VTI) anisotropy along a horizontal section of a wellbore drilled into a formation are provided. One embodiment comprises determining elastic constants C11, C44, and C66 of the horizontal section and determining a vertical compressional slowness of the horizontal section corresponding to an elastic constant C33 of the horizontal section using a model with a condition. The model is built using second sonic log data and second density log data of the vertical wellbore. The condition is that the shear slowness (DTS) of the vertical wellbore is equal to the vertically polarized shear slowness (DTSV) of the horizontal section. The embodiment further comprises determining a VTI anisotropy along the horizontal section using the elastic constants C11, C44, C66, and C33 of the horizontal section.

22 Claims, 12 Drawing Sheets

(51) Int. Cl.
*G01V 5/12* (2006.01)
*G01V 11/00* (2006.01)

(52) U.S. Cl.
CPC .... *G01V 2210/47* (2013.01); *G01V 2210/626* (2013.01)

(58) Field of Classification Search
USPC .......................................................... 702/6
See application file for complete search history.

(56) References Cited

U.S. PATENT DOCUMENTS

| | | |
|---|---|---|
| 2015/0012251 A1 | 1/2015 | Horne et al. |
| 2016/0290113 A1 | 10/2016 | Kisra et al. |
| 2016/0291181 A1* | 10/2016 | Sinha ........................ G01V 1/50 |

OTHER PUBLICATIONS

Hornby, Brian E., et al.; "Anisotropy Correction for Deviated-Well Sonic Logs: Application to Seismic Well Tie"; (2003), Geophysics, vol. 68, No. 2, pp. 464-471.

Horne, S.A., et al.; "Research Note: Transverse Isotropy Estimation from Dipole Sonic Logs Acquired in Pilot and Production Wells"; (2014), Geophysical Prospecting, vol. 62, pp. 404-411.

Murphy, Eric, et al.; "New Models for Acoustic Anisotropic Interpretation in Shale"; (2015), SPWLA 56th Annual Logging Symposium, pp. 1-15.

Norris, Andrew N., et al.; "Weak Elastic Anisotropy and the Tube Wave"; (1993), Geophysics, vol. 58, No. 8, pp. 1091-1098.

Quirein, John, et al.; "Predicting the Stiffness Tensor of a Transversely Isotropic Medium When the Vertical Poisson's Ratio is Less than the Horrizontal Poisson's Ratio"; (2014), SPWLA 55th Annual Logging Symposium, pp. 1-11.

Sayers, Colin, et al.; "Anisotropy Estimate for the Horn River Basin from Sonic Logs in Vertical and Deviated Wells"; (2015), The Leading Edge, Special Section: Borehole Geophysics and Sonic Logging, pp. 296-306.

Thomsen, L.A.; "Fluid Dependence of Anisotropy Parameters"; Tu 01 05, 75th EAGE Conference & Exhibition incorporating SPE EUROPEC 2013, London, UK, (Jun. 2013), 5 pages.

Thomsen, Leon; "Weak Elastic Anisotropy"; (Oct. 1986), Geophysics, vol. 51, No. 10, pp. 1954-1966.

Vernik, Lev, et al.; "Velocity Anisotropy in Shales: A Petrophysical Study"; (1997), Geophysics, vol. 62, No. 2, pp. 521-532.

Hows, A.M., et al.; "Characterization of Anisotropic Dynamic Mechanical Rock Properties in Shale Gas Plays"; ARMA 13-604, (Jun. 23, 2013), 14 pages.

Greenberg, M.L., et al; "Shear-Wave Velocity Estimation in Porous Rocks: Theoretical Formulation, Preliminary Verification and Applications"; (1992), Geophysical Prospecting, vol. 40, pp. 195-209.

Extended European Search Report, dated Aug. 21, 2020, during the prosecution of EP Application No. 20168296.0.

* cited by examiner

```
                                    300
┌─────────────────────────────────┐
│ placing a sonic logging tool    │
│ downhole in a horizontal        │
│ section of a wellbore drilled   │
│ into a formation 305            │
└─────────────────────────────────┘
              │
              ▼
┌─────────────────────────────────┐      Horizontal Section
│ generating seismic waves using  │    ┌──────────────────────────────┐
│ the sonic logging tool placed   │    │ measuring horizontally       │
│ downhole in the horizontal      │    │ polarized shear slowness     │
│ section 310                     │    │ (DTSH) of the seismic waves  │
└─────────────────────────────────┘    │ using the sonic logging tool │
              │                         │ placed downhole in the       │
              ▼                         │ horizontal section and       │
┌─────────────────────────────────┐    │ determining an elastic       │
│ Receiving the seismic waves at  │    │ constant C66 of the          │
│ the sonic logging tool placed   │    │ horizontal section using the │
│ downhole in the horizontal      │    │ horizontally polarized shear │
│ section 315                     │    │ slowness (DTSH) and the      │
└─────────────────────────────────┘    │ density log data measured in │
              │                         │ the horizontal section       │
              ▼                         │ (e.g., C66 =                 │
┌─────────────────────────────────┐    │ $\frac{\rho}{s^2_{DTSH}}$    │
│ measuring compressional         │    │ where ρ is the density log   │
│ slowness (DTCO) of the seismic  │    │ data of the horizontal       │
│ waves using the sonic logging   │    │ section) 330                 │
│ tool placed downhole in the     │    └──────────────────────────────┘
│ horizontal section and          │                  │
│ determining an elastic constant │                  │
│ C11 of the horizontal section   │                  │
│ using the compressional         │                  │
│ slowness (DTCO) and density     │                  │
│ log data measured in the        │                  │
│ horizontal section (e.g.,       │                  │
│ C11 = $\frac{\rho}{s^2_{DTCO}}$ │                  │
│ where ρ is the density log      │                  │
│ data of the horizontal          │                  │
│ section) 320                    │                  │
└─────────────────────────────────┘                  │
              │                                       │
              ▼                             ┌────────────────┐
┌─────────────────────────────────┐         │ 360 of FIG. 3C │
│ measuring vertically polarized  │         └────────────────┘
│ shear slowness (DTSV) of the    │
│ seismic waves using the sonic   │
│ logging tool placed downhole in │
│ the horizontal section and      │
│ determining an elastic constant │
│ C44 of the horizontal section   │
│ using the vertically polarized  │──────────┘
│ shear slowness (DTSV) and the   │
│ density log data measured in    │
│ the horizontal section          │
│ (e.g., C44 =                    │
│ $\frac{\rho}{s^2_{DTSV}}$       │
│ where ρ is the density log data │
│ of the horizontal section) 325  │
└─────────────────────────────────┘                 FIG. 3A
```

400

Horizontal Section placing a density logging tool downhole in the horizontal section 405

↓ generating gamma rays using the density logging tool placed downhole in the horizontal section 410

↓ receiving the gamma rays at the density logging tool placed downhole in the horizontal section and measuring the gamma rays using the density logging tool downhole in the horizontal section to generate density log data of the horizontal section 415

↓ generating the density log data of the horizontal section 420

Vertical Wellbore placing a second density logging tool downhole in the vertical wellbore 505

↓ generating second gamma rays using the second density logging tool placed downhole in the vertical wellbore 510

↓ receiving the second gamma rays at the second density logging tool placed downhole in the vertical wellbore and measuring the second gamma rays using the second density logging tool downhole in the vertical wellbore to generate second density log data of the vertical wellbore 515

↓ generating the second density log data measured in the vertical wellbore 520

FIG. 5

```
┌─────────────────────────────────────────────────────────────────────┐
│ receiving sonic log data and density log data of a horizontal section of a wellbore │
│ drilled into the formation, wherein the sonic log data comprises compressional │
│ slowness (DTCO) measured in the horizontal section, vertically polarized shear │
│ slowness (DTSV) measured in the horizontal section, and horizontally polarized │
│ shear slowness (DTSH) measured in the horizontal section 905 │
└─────────────────────────────────────────────────────────────────────┘
                                   ▼
┌─────────────────────────────────────────────────────────────────────┐
│ receiving second sonic log data and second density log data of a vertical wellbore │
│ drilled into the formation, wherein the second sonic log data of the vertical wellbore │
│ comprises shear slowness (DTS) measured in the vertical wellbore and │
│ compressional slowness (DTCO) measured in the vertical wellbore) 910 │
└─────────────────────────────────────────────────────────────────────┘
                                   ▼
┌─────────────────────────────────────────────────────────────────────┐
│ determining an elastic constant C11 of the horizontal section using the │
│ compressional slowness (DTCO) and the density log data measured in the │
│ horizontal section 915 │
└─────────────────────────────────────────────────────────────────────┘
                                   ▼
┌─────────────────────────────────────────────────────────────────────┐
│ determining an elastic constant C44 of the horizontal section using the vertically │
│ polarized shear slowness (DTSV) and the density log data measured in the │
│ horizontal section 920 │
└─────────────────────────────────────────────────────────────────────┘
                                   ▼
┌─────────────────────────────────────────────────────────────────────┐
│ determining an elastic constant C66 of the horizontal section using the horizontally │
│ polarized shear slowness (DTSH) and the density log data measured in the │
│ horizontal section 925 │
└─────────────────────────────────────────────────────────────────────┘
                                   ▼
┌─────────────────────────────────────────────────────────────────────┐
│ determining a vertical compressional slowness of the horizontal section │
│ corresponding to an elastic constant C33 of the horizontal section using a model │
│ with a condition, wherein the model is built using the second sonic log data and the │
│ second density log data of the vertical wellbore drilled into the formation, and │
│ wherein the condition is that the shear slowness (DTS) of the vertical wellbore is │
│ equal to the vertically polarized shear slowness (DTSV) of the horizontal section │
│ 930 │
└─────────────────────────────────────────────────────────────────────┘
                                   ▼
┌─────────────────────────────────┐  ┌──────────────────────────────┐
│ determining an elastic constant C13 of the │ │ determining a VTI anisotropy along │
│ horizontal section using: Stoneley mode, an │→│ the horizontal section using the │
│ empirical relationship between the elastic │ │ elastic constants C11, C44, C66, │
│ constant C11 of the horizontal section, the │ │ and C33 (and optionally C13) of │
│ elastic constant C44 of the horizontal │ │ the horizontal section 935 │
│ section, the elastic constant C66 of the │ └──────────────────────────────┘
│ horizontal section, the elastic constant C33 │                ▼
│ of the horizontal section, or any │ ┌──────────────────────────────┐
│ combination thereof, or any combination │ │ using the determined VTI │
│ thereof; and using the elastic constant C13 │ │ anisotropy along the horizontal │
│ in determining the VTI anisotropy along the │ │ section for seismic imaging, │
│ horizontal section 945 │ │ fracturing simulation, a fracturing │
└─────────────────────────────────┘ │ process, or any combination │
                                    │ thereof 940 │
                                    └──────────────────────────────┘
```

DETERMINING A VERTICALLY TRANSVERSE ISOTROPY (VTI) ANISOTROPY ALONG A HORIZONTAL SECTION OF A WELLBORE DRILLED INTO A FORMATION

CROSS REFERENCES TO RELATED APPLICATIONS

N/A

STATEMENT REGARDING FEDERALLY SPONSORED RESEARCH OR DEVELOPMENT

Not applicable.

TECHNICAL FIELD

The present disclosure relates to determining a vertically transverse isotropy (VTI) anisotropy along a horizontal section of a wellbore drilled into a formation.

BACKGROUND

An active survey typically involves deploying seismic sources and seismic sensors at predetermined locations. The seismic sources generate seismic waves, such as acoustic waves, which propagate into the geological medium creating pressure changes and vibrations. Variations in physical properties of the geological medium change the properties of the seismic waves, such as their direction of propagation and other properties. The two main types of seismic waves are P waves (also referred to as compressional waves) and S waves (also referred to as shear waves). P waves relate to pressure and pass through liquids and solids. S waves relate to shear and pass through solids. P waves typically travel faster than S waves.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the seismic sensors generate corresponding electrical signals, known as traces, and record them in storage media as seismic data. The seismic data will include a plurality of "shots" (individual instances of the seismic source being activated), each of which are associated with a plurality of traces recorded at the plurality of seismic sensors.

The seismic data is processed to create seismic images that can be interpreted to identify subsurface geologic features including hydrocarbon deposits. The processing may include data conditioning methods (e.g., deghosting, noise attenuation, spectral enhancement, etc.), velocity estimation (e.g., semblance analysis, tomography, etc.), and seismic imaging (e.g., time migration, depth migration, reverse time migration, etc.). The seismic images that are produced are a representation of the physical subsurface and can be used to identify hydrocarbon reservoirs. For example, the seismic images may be used to control well drilling in order to drill wellbores that will produce hydrocarbons from the hydrocarbon reservoirs.

Processing the seismic data oftentimes includes determining anisotropy. Anisotropy is the variation of a physical property depending on the direction in which the property is measured. For example, rocks such as shales are anisotropic due to layering and a partial alignment of plate-like clay minerals. When seismic waves travel through such anisotropic layers, the seismic velocity of the waves vary depending on the direction in which the velocity is measured. Anisotropy is used to generate the seismic images.

The ability to define, at high granularity, the location of rock and fluid property changes in the subsurface is crucial to our ability to make the most appropriate decisions for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

Thus, there exists a need in the area of anisotropy, and in particular, a need for determining anisotropy, especially vertically transverse isotropy (VTI) anisotropy, along a horizontal section of a wellbore drilled into a formation.

SUMMARY

Embodiments of determining a vertically transverse isotropy (VTI) anisotropy along a horizontal section of a wellbore drilled into a formation are provided herein. One embodiment of a method of determining a vertically transverse isotropy (VTI) anisotropy along a horizontal section of a wellbore drilled into a formation comprises: placing a sonic logging tool downhole in the horizontal section of the wellbore drilled into the formation and receiving seismic waves at the sonic logging tool placed downhole in the horizontal section. The embodiment further comprises measuring compressional slowness (DTCO) of the seismic waves using the sonic logging tool placed downhole in the horizontal section and determining an elastic constant C11 of the horizontal section using the compressional slowness (DTCO) and density log data measured in the horizontal section. The embodiment further comprises measuring vertically polarized shear slowness (DTSV) of the seismic waves using the sonic logging tool placed downhole in the horizontal section and determining an elastic constant C44 of the horizontal section using the vertically polarized shear slowness (DTSV) and the density log data measured in the horizontal section. The embodiment further comprises measuring horizontally polarized shear slowness (DTSH) of the seismic waves using the sonic logging tool placed downhole in the horizontal section and determining an elastic constant C66 of the horizontal section using the horizontally polarized shear slowness (DTSH) and the density log data measured in the horizontal section. The embodiment further comprises determining a vertical compressional slowness of the horizontal section corresponding to an elastic constant C33 of the horizontal section using a model with a condition. The model is built using second sonic log data and second density log data of at vertical wellbore drilled into the formation. The second sonic log data of the vertical wellbore comprises shear slowness (DTS) measured in the vertical wellbore and compressional slowness (DTCO) measured in the vertical wellbore. The condition is that the shear slowness (DTS) of the vertical wellbore is equal to the vertically polarized shear slowness (DTSV) of the horizontal section. The embodiment further comprises determining a VTI anisotropy along the horizontal section using the elastic constants C11, C44, C66, and C33 of the horizontal section.

One embodiment of a computer implemented method of determining a vertically transverse isotropy (VTI) anisotropy along a horizontal section of a wellbore drilled into a formation comprises receiving sonic log data and density log data of the horizontal section of the wellbore drilled into the formation. The sonic log data comprises compressional slowness (DTCO) measured in the horizontal section, vertically polarized shear slowness (DTSV) measured in the horizontal section, and horizontally polarized shear slowness (DTSH) measured in the horizontal section. The embodiment further comprises receiving second sonic log data and second density log data of a vertical wellbore drilled into the formation. The second sonic log data of the vertical wellbore comprises shear slowness (DTS) measured in the vertical wellbore and compressional slowness (DTCO) measured in the vertical wellbore. The embodiment further comprises determining an elastic constant C11 of the horizontal section using the compressional slowness (DTCO) and the density log data measured in the horizontal section; determining an elastic constant C44 of the horizontal section using the vertically polarized shear slowness (DTSV) and the density log data measured in the horizontal section; and determining an elastic constant C66 of the horizontal section using the horizontally polarized shear slowness (DTSH) and the density log data measured in the horizontal section. The embodiment further comprises determining a vertical compressional slowness of the horizontal section corresponding to an elastic constant C33 of the horizontal section using a model with a condition. The model is built using the second sonic log data and the second density log data of the vertical wellbore drilled into the formation. The condition is that the shear slowness (DTS) of the vertical wellbore is equal to the vertically polarized shear slowness (DTSV) of the horizontal section. The embodiment further comprises determining a VTI anisotropy along the horizontal section using the elastic constants C11, C44, C66, and C33 of the horizontal section.

One embodiment of a system of determining a vertically transverse isotropy (VTI) anisotropy along a horizontal section of a wellbore drilled into a formation comprises a processor and a memory communicatively connected to the processor and the memory storing computer-executable instructions which, when executed, cause the processor to perform receiving sonic log data and density log data of the horizontal section of the wellbore drilled into the formation. The sonic log data comprises compressional slowness (DTCO) measured in the horizontal section, vertically polarized shear slowness (DTSV) measured in the horizontal section, and horizontally polarized shear slowness (DTSH) measured in the horizontal section. The embodiment further comprises receiving second sonic log data and second density log data of a vertical wellbore drilled into the formation. The second sonic log data of the vertical wellbore comprises shear slowness (DTS) measured in the vertical wellbore and compressional slowness (DTCO) measured in the vertical wellbore. The embodiment further comprises determining an elastic constant C11 of the horizontal section using the compressional slowness (DTCO) and the density log data measured in the horizontal section; determining an elastic constant C44 of the horizontal section using the vertically polarized shear slowness (DTSV) and the density log data measured in the horizontal section; and determining an elastic constant C66 of the horizontal section using the horizontally polarized shear slowness (DTSH) and the density log data measured in the horizontal section. The embodiment further comprises determining a vertical compressional slowness of the horizontal section corresponding to an elastic constant C33 of the horizontal section using a model with a condition. The model is built using the second sonic log data and the second density log data of the vertical wellbore drilled into the formation. The condition is that the shear slowness (DTS) of the vertical wellbore is equal to the vertically polarized shear slowness (DTSV) of the horizontal section. The embodiment further comprises determining a VTI anisotropy along the horizontal section using the elastic constants C11, C44, C66, and C33 of the horizontal section.

DESCRIPTION OF THE DRAWINGS

FIGS. 3A-3C illustrate one embodiment of a method of determining a VTI anisotropy along a horizontal section of a wellbore drilled into a formation.

FIG. 4 illustrates one embodiment of a method of generating density log data of a horizontal section of a wellbore drilled into a formation.

FIG. 5 illustrates one embodiment of a method of generating second density log data of a vertical wellbore drilled into a formation.

FIG. 9 illustrates one embodiment of a method of determining a VTI anisotropy along a horizontal section of a wellbore drilled into a formation.

Figure 1A:
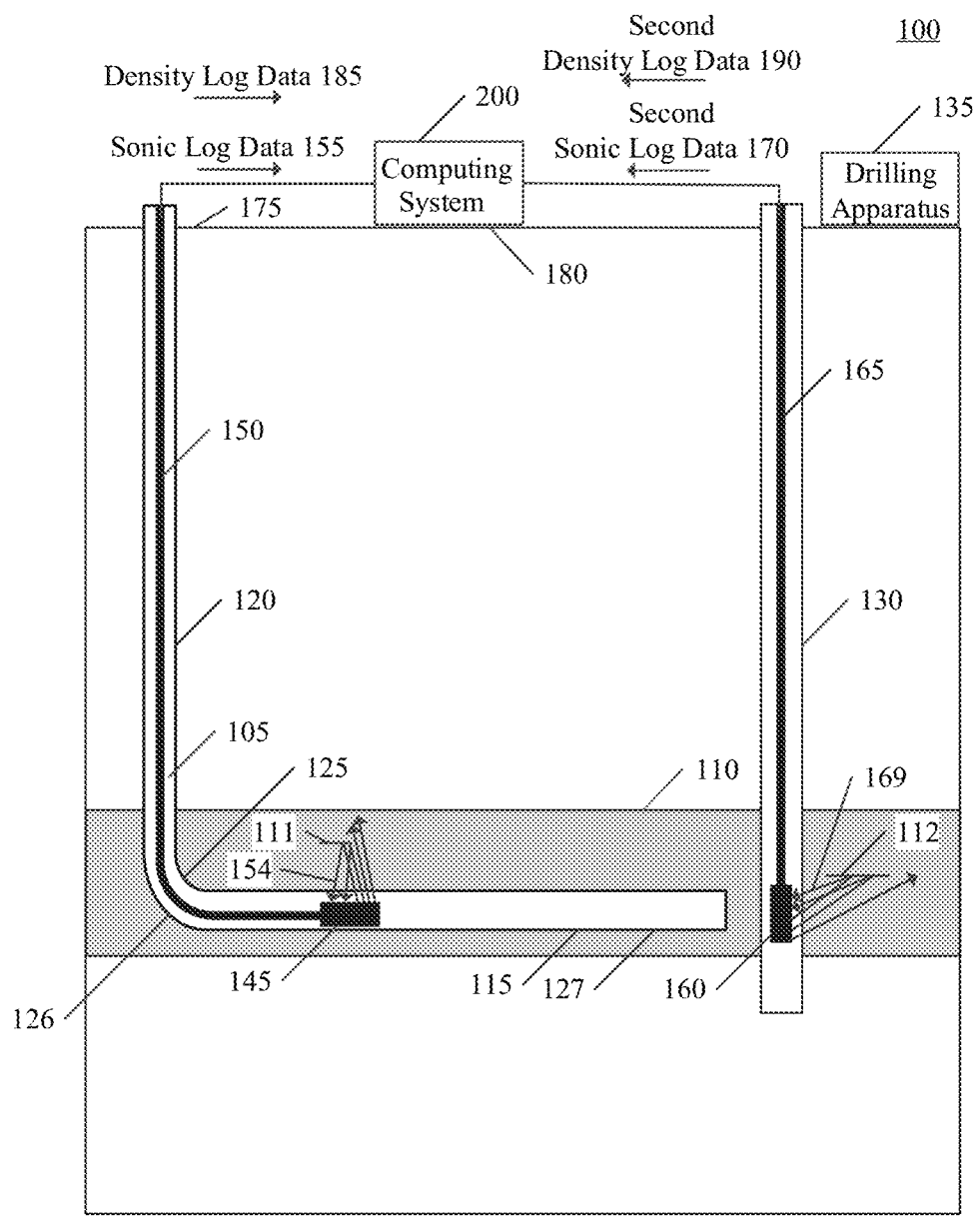
FIGS. 1A-1B illustrate one embodiment of a system of determining a vertically transverse isotropy (VTI) anisotropy along a horizontal section of a wellbore drilled into a formation.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

DETAILED DESCRIPTION

TERMINOLOGY: The following terms will be used throughout the specification and will have the following meanings unless otherwise indicated.

Formation: Hydrocarbon exploration processes, hydrocarbon recovery (also referred to as hydrocarbon production) processes, or any combination thereof may be performed on a formation. The formation refers to practically any volume under a surface. For example, the formation may be practically any volume under a terrestrial surface (e.g., a land surface), practically any volume under a seafloor, etc. A water column may be above the formation, such as in marine hydrocarbon exploration, in marine hydrocarbon recovery, etc. The formation may be onshore. The formation may be offshore (e.g., with shallow water or deep water above the formation). The formation may include faults, fractures, overburdens, underburdens, salts, salt welds, rocks, sands, sediments, pore space, etc. Indeed, the formation may include practically any geologic point(s) or volume(s) of interest (such as a survey area) in some embodiments.

The formation may include hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons, gas hydrocarbons, and solid hydrocarbons), etc. Light crude oil, medium oil, heavy crude oil, and extra heavy oil, as defined by the American Petroleum Institute (API) gravity, are examples of hydrocarbons. Examples of hydrocarbons are many, and hydrocarbons may include oil, natural gas, kerogen, bitumen, etc. The hydrocarbons may be discovered by hydrocarbon exploration processes.

The formation may also include at least one wellbore. For example, at least one wellbore may be drilled into the formation in order to confirm the presence of the hydrocarbons. As another example, at least one wellbore may be drilled into the formation in order to recover (also referred to as produce) the hydrocarbons. The hydrocarbons may be recovered from the entire formation or from a portion of the formation. For example, the formation may be divided into one or more hydrocarbon zones, and hydrocarbons may be recovered from each desired hydrocarbon zone. One or more of the hydrocarbon zones may even be shut-in to increase hydrocarbon recovery from a hydrocarbon zone that is not shut-in.

The formation, the hydrocarbons, or any combination thereof may also include non-hydrocarbon items. For example, the non-hydrocarbon items may include connate water, brine, tracers, items used in enhanced oil recovery or other hydrocarbon recovery processes, items from other treatments (e.g., items used in conformance control), etc.

In short, each formation may have a variety of characteristics, such as petrophysical rock properties, reservoir fluid properties, reservoir conditions, hydrocarbon properties, or any combination thereof. For example, each formation (or even zone or portion of the formation) may be associated with one or more of: temperature, porosity, salinity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, mineral, metal, a formation having a permeability in the range of 0.01 microdarcy to 10 millidarcy, a formation having a permeability in the range of 10 millidarcy to 40,000 millidarcy, etc.

The terms "formation", "subsurface formation", "hydrocarbon-bearing formation", "reservoir", "subsurface reservoir", "subsurface region of interest", "subsurface volume of interest", and the like may be used synonymously. The terms "formation", "hydrocarbons", and the like are not limited to any description or configuration described herein.

Wellbore: A wellbore refers to a single hole, usually cylindrical, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations). The wellbore may also be configured to be in fluidic communication with the surface, such as in fluidic communication with a surface facility that may include oil/gas/water separators, gas compressors, storage tanks, pumps, gauges, sensors, meters, pipelines, etc.

The wellbore may be used for injection (sometimes referred to as an injection wellbore) in some embodiments. The wellbore may be used for production (sometimes referred to as a production wellbore) in some embodiments. The wellbore may be used for a single function, such as only injection, in some embodiments. The wellbore may be used for a plurality of functions, such as production then injection, in some embodiments. Indeed, the use of the wellbore may also be changed, for example, a particular wellbore may be turned into an injection wellbore after a different previous use as a production wellbore. The wellbore may be drilled amongst existing wellbores, for example, as an infill wellbore. A wellbore may be utilized for injection and a different wellbore may be used for hydrocarbon production, such as in the scenario that hydrocarbons are swept from at least one injection wellbore towards at least one production wellbore and up the at least one production wellbore towards the surface for processing. On the other hand, a single wellbore may be utilized for injection and hydrocarbon production, such as a single wellbore used for hydraulic fracturing and hydrocarbon production. A plurality of wellbores (e.g., tens to hundreds of wellbores) are often used in a field to recover hydrocarbons.

The wellbore may have straight, directional, or a combination of trajectories. For example, the wellbore may be a vertical wellbore, a horizontal wellbore, a multilateral wellbore, an inclined wellbore, a slanted wellbore, etc. The wellbore may include a change in deviation. As an example, the deviation is changing when the wellbore is curving. In a horizontal wellbore, the deviation is changing at the curved section (sometimes referred to as the heel). As used herein, a horizontal section of a wellbore is drilled in a horizontal direction (or substantially horizontal direction). For example, a horizontal section of a wellbore is drilled towards the bedding plane direction. A horizontal section of a wellbore may be, but is not limited to, the horizontal section of a horizontal wellbore. On the other hand, a vertical wellbore is drilled in a vertical direction (or substantially vertical direction). For example, a vertical wellbore is drilled perpendicular (or substantially perpendicular) to the bedding plane direction.

The wellbore may include a plurality of components, such as, but not limited to, a casing, a liner, a tubing string, a heating element, a sensor, a packer, a screen, a gravel pack, artificial lift equipment (e.g., an electric submersible pump (ESP)), etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the formation, producing a fluid from the formation, or any combination thereof. The casing may be cemented in place, with the cement positioned in the annulus between the formation and the outside of the casing. The wellbore may also include any completion hardware that is not discussed separately. If the wellbore is drilled offshore, the wellbore may include some of the previous components plus other offshore components, such as a riser.

The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. In some embodiments, the same control devices may be used to control fluid flow into and out of the wellbore. In some embodiments, different control devices may be used to control fluid flow into and out of the wellbore. In some embodiments, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the wellbore, the formation, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the formation, the hydrocarbons, etc. However, for simplicity, the term "drilling apparatus" is meant to represent any drill bit(s), drill string(s), drilling fluid(s), and other equipment and techniques related to drilling the wellbore.

The term "wellbore" may be used synonymously with the terms "borehole," "well," or "well bore." The term "wellbore" is not limited to any description or configuration described herein.

Hydrocarbon recovery: The hydrocarbons may be recovered (sometimes referred to as produced) from the formation using primary recovery (e.g., by relying on pressure to recover the hydrocarbons), secondary recovery (e.g., by using water injection (also referred to as waterflooding) or natural gas injection to recover hydrocarbons), enhanced oil recovery (EOR), or any combination thereof. Enhanced oil recovery or simply EOR refers to techniques for increasing the amount of hydrocarbons that may be extracted from the formation. Enhanced oil recovery may also be referred to as tertiary oil recovery. Secondary recovery is sometimes just referred to as improved oil recovery or enhanced oil recovery. EOR processes include, but are not limited to, for example: (a) miscible gas injection (which includes, for example, carbon dioxide flooding), (b) chemical injection (sometimes referred to as chemical enhanced oil recovery (CEOR) that includes, for example, polymer flooding, alkaline flooding, surfactant flooding, conformance control, as well as combinations thereof such as alkaline-polymer flooding, surfactant-polymer flooding, or alkaline-surfactant-polymer flooding), (c) microbial injection, (d) thermal recovery (which includes, for example, cyclic steam and steam flooding), or any combination thereof.

The hydrocarbons may be recovered from the formation using a fracturing process. For example, a fracturing process may include fracturing using electrodes, fracturing using fluid (oftentimes referred to as hydraulic fracturing), etc. For example, a hydraulic fracturing process may entail preparing an injection fluid (oftentimes referred to a fracturing fluid) and injecting that fracturing fluid into the wellbore at a sufficient rate and pressure to open existing fractures, create fractures, or any combination thereof in the formation. The formation proximate to a wellbore may be fractured for the first time or refractured. The fractures permit hydrocarbons to flow more freely from the formation into the wellbore. Fracturing may be performed onshore, offshore, or any combination thereof.

In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants. The wellbore and formation proximate to the wellbore are in fluid communication (e.g., via perforations), and the fracturing fluid with the proppants is injected into the wellbore through the wellhead of the wellbore using at least one pump (oftentimes called a fracturing pump). The fracturing fluid with the proppants is injected at a sufficient rate and pressure to open existing fractures and/or create fractures in the formation. As fractures become sufficiently wide to allow proppants to flow into those fractures, proppants in the fracturing fluid are deposited in those fractures during injection of the fracturing fluid. The fracturing fluid is removed by flowing or pumping it back out of the same wellbore so that the fracturing fluid does not block the flow of hydrocarbons to the same wellbore. The hydrocarbons will typically enter the same wellbore from the formation and flow up to the surface for further processing. The fracturing process may involve clusters and staging in some embodiments.

The equipment to be used in preparing the fracturing fluid, injecting the fracturing fluid, and fracturing with the fracturing fluid may be dependent on the fracturing fluid, on the proppants, on the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and techniques related to preparing the fracturing fluid, injecting the fracturing fluid, and fracturing with the fracturing fluid. Those of ordinary will also appreciate that there may be some overlap between the "fracturing apparatus" and the equipment used in other hydrocarbon recovery processes, such that some items (e.g., a tank, a mixer, etc.) may be used in multiple processes.

Other hydrocarbon recovery processes may also be utilized to recover the hydrocarbons. For example, the hydrocarbons may be recovered from the formation using radio frequency (RF) heating. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments.

Other definitions: The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

Unless defined otherwise, all technical and scientific terms used herein have the same meanings as commonly understood by one of skill in the art to which the disclosed invention belongs. All citations referred herein are expressly incorporated by reference.

OVERVIEW: Anisotropy is represented by elastic anisotropy parameters (or simply anisotropy parameters), such as Thomsen anisotropy parameters. Elastic anisotropy parameters are used in a number of different oilfield scenarios, such as microseismic event location monitoring and stress profile calculations. However, the ability to measure all the elastic anisotropy parameters from a single wellbore is limited as the elastic waves are controlled by a subset of the elastic anisotropy parameters.

One traditional technique to determine the elastic anisotropy parameters is to use an empirical approach to predict the missing parameters, as described in (1) U.S. Pat. No. 8,175,807 to Suarez-Rivera, R. and T. Bratton, (2) Quirein, J., Eid, M. and A. Cheng. 2014. Predicting the Stiffness Tensor of a Transversely Isotropic Medium when the Vertical Poisson's Ratio is less than the Horizontal Poisson's Ratio. SPWLA, and (3) Murphy, E., Barraza, S. R., Gu, M., Gokaraju, D., Far, M., Quirein, J. 2015. New Models for Acoustic Anisotropic Interpretation in Shale. SPWLA 56th Annual Logging Symposium. July 18-22, Long Beach, Calif., USA, each of which is incorporated by reference. However, such models may not be sufficiently accurate because they are calibrated using core data of a core sample of a formation.

First, core samples are not always extracted from the formation, and therefore, core data may not be available. Second, when core data is available, the core data may not be appropriate because (1) it is difficult to extract a core sample from the formation without damaging the core sample (e.g., saturation may change), (2) expansion cracks, (3) core measurements to obtain velocities are measured at different frequencies so it may not provide an apples to apples comparison, (4) sampling bias if a core sample is not representative of the whole formation (e.g., the core sample is a few feet of the formation, but the formation may include several thousand feet), etc. Unfortunately, the empirical models that are generated using this technique may not be accurate due to the reliance of the core data. Moreover, the anisotropy determined with this technique may not be accurate as the anisotropy along the horizontal section of the wellbore because these empirical models may not hold for the anisotropy along the horizontal section of the wellbore.

Another traditional technique of determining the elastic anisotropy parameters for the anisotropy is to combine sonic logs from multiple deviated wells through the same formation and determine the anisotropy from the systematic change in the observed sonic responses (as indicated by Hornby, B. E., Howie, J., Ince, D., 2003, Anisotropy correction for deviated-well sonic logs: Application to seismic well tie. Geophysics. 68(2) 464-471, which is incorporated by reference). However, this approach requires the formation to be laterally homogeneous so that any change in the response can be considered to be entirely due to anisotropic effects. Unfortunately, the anisotropy determined with this technique may not be accurate as the anisotropy along the horizontal section of the wellbore because lateral homogeneity is not always present in the formation.

A modification of this technique makes use of recent well configurations used in tight rock plays where a vertical pilot wellbore is drilled to delineate the top and bottom of the target formation, and a subsequent deviated well is then drilled along formation and usually hydraulically stimulated. In the case that the vertical and build sections are logged with sonic tools, then the information between these two wells may be combined to yield all the information to determine the five VTI elastic constants C11, C33, C44, C55, and C66 (as indicated in Home, S., Walsh, J. 2014. Research Note: Transverse isotropy estimation from dipole sonic logs acquired in pilot and production wells. Geophysical Prospecting 62(2) 404-411, which is incorporated by reference). Furthermore, since the deviated wells are drilled with a medium radius build rate, the distance between the two wells is relatively small resulting in a relatively small distance between the two wells, resulting in less lateral variation. However, the anisotropy determined with this modification may not be accurate as the anisotropy along the horizontal section of the wellbore because of problems matching corresponding depths between the wells.

Another traditional technique relies on geo-statistics to predict velocities, as indicated in Sayers, C., den Boer, L. 2015. Anisotropy estimate for the Horn River Basin from sonic logs. The Leading Edge 34(3) 296-306, which is incorporated by reference. However, the anisotropy determined with this technique may not be accurate as the anisotropy along the horizontal section of the wellbore because such methods are too smooth to capture more detailed variations in the rocks.

On the other hand, the embodiments provided herein focuses on determining a VTI anisotropy along a horizontal section of a wellbore drilled into a formation using elastic constants C11, C44, C33, and C66 (and optionally C13). As will be discussed further herein, some embodiments include using density log data and direct measurements from the horizontal section of the wellbore and equations to determine the elastic constants C11, C44, and C66 of the horizontal section of the wellbore.

Moreover, some embodiments include determining a vertical compressional slowness of the horizontal section corresponding to an elastic constant C33 of the horizontal section using a model with a condition. The model is built using second sonic log data and second density log data of a vertical wellbore drilled into the same formation as the horizontal section of the wellbore. The second sonic log data of the vertical wellbore comprises shear slowness (DTS) measured in the vertical wellbore and compressional slowness (DTCO) measured in the vertical wellbore. Of note, although a single vertical wellbore may be described herein for simplicity, the inventive principles may apply to a plurality of vertical wellbores.

The condition is that the shear slowness (DTS) of the vertical wellbore is equal to the vertically polarized shear slowness (DTSV) of the horizontal section. The condition relies on the vertically polarized shear slowness (DTSV) of the horizontal section traveling at the same speed as the shear slowness (DTS) of the vertical wellbore, or in other words, vertical shear slowness is determined in the horizontal section. With this condition, the vertical compressional slowness of the horizontal section may be determined from the vertically polarized shear slowness (DTSV) of the horizontal section using second sonic log data derived from vertical sonic log data in at least one neighboring wellbore, such as the vertical wellbore. Vertical well data is more readily available, and compressional and shear slownesses are very well correlated (e.g., FIG. 7). The determined vertical compressional slowness allows the elastic constant C33 to be determined for the horizontal section.

The elastic constants C33, C11, C44, and C66 may be utilized to fully characterize the formation, such as a VTI formation, including determining the VTI anisotropy along the horizontal section. The remaining unknown elastic constant C13 of the horizontal section may also be determined and utilized to fully characterize the formation, including determining the VTI anisotropy along the horizontal section.

Indeed, provided herein are embodiments of systems and methods of determining a vertically transverse isotropy (VTI) anisotropy along a horizontal section of a wellbore drilled into a formation. For example, one embodiment of a method includes placing a sonic logging tool downhole in a horizontal section of a wellbore drilled into a formation and receiving seismic waves at the sonic logging tool placed downhole in the horizontal section. The embodiment of the method includes measuring compressional slowness (DTCO) of the seismic waves using the sonic logging tool placed downhole in the horizontal section and determining an elastic constant C11 of the horizontal section using the compressional slowness (DTCO) and density log data measured in the horizontal section. The embodiment of the method includes measuring vertically polarized shear slowness (DTSV) of the seismic waves using the sonic logging tool placed downhole in the horizontal section and determining an elastic constant C44 of the horizontal section using the vertically polarized shear slowness (DTSV) and the density log data measured in the horizontal section. The embodiment of the method includes measuring horizontally polarized shear slowness (DTSH) of the seismic waves using the sonic logging tool placed downhole in the horizontal section and determining an elastic constant C66 of the horizontal section using the horizontally polarized shear slowness (DTSH) and the density log data measured in the horizontal section. The embodiment of the method includes determining a vertical compressional slowness of the horizontal section corresponding to an elastic constant C33 of the horizontal section using a model with a condition. The model is built using second sonic log data and second density log data of a vertical wellbore drilled into the formation (e.g., one or more vertical wellbores drilled into the formation). The second sonic log data of the vertical wellbore comprises shear slowness (DTS) measured in the vertical wellbore and compressional slowness (DTCO) measured in the vertical wellbore. The condition is that the shear slowness (DTS) of the vertical wellbore is equal to the vertically polarized shear slowness (DTSV) of the horizontal section. The embodiment of the method includes determining a VTI anisotropy along the horizontal section using the elastic constants C11, C44, C66, and C33 of the horizontal section. In some embodiments, determining a VTI anisotropy along the horizontal section comprises determining at least one Thomsen anisotropy parameter. In some embodiments, determining an elastic constant C13 of the horizontal section includes using: (a) Stoneley mode; (b) an empirical relationship between the elastic constant C11 of the horizontal section, the elastic constant C44 of the horizontal section, the elastic constant C66 of the horizontal section, the elastic constant C33 of the horizontal section, or any combination thereof; or (c) any combination thereof. The elastic constant C13 may be used in determining the VTI anisotropy along the horizontal section.

Advantageously, those of ordinary skill in the art will appreciate that the VTI anisotropy determined according to the principles of the present disclosure may be utilized to generate a more accurate digital seismic image, as the VTI anisotropy results in the directional dependence of velocity that is taken into account in order to generate the more accurate subsurface seismic image. The more accurate digital seismic image may provide details of the subsurface that were illustrated poorly or not at all in traditional seismic images. The more accurate digital seismic image may better delineate where different features begin, end, or any combination thereof. As one example, the more accurate digital seismic image may illustrate faults more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced or avoided depending on the desired outcome. Thus, the more accurate digital seismic image may improve hydrocarbon exploration and improve hydrocarbon production.

Advantageously, those of ordinary skill in the art will appreciate that the more accurate digital seismic image may be utilized in hydrocarbon exploration and hydrocarbon production for decision making. For example, the more accurate digital seismic image may be utilized to pick a location for a wellbore. Continuing with the hydrocarbon deposit example, if the decision is made to produce the hydrocarbon deposit indicated by the more accurate digital seismic image, those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit. If the decision is made to avoid the hydrocarbon deposit indicated by the more accurate digital seismic image, those of ordinary skill in the art will appreciate that the bounds of the hydrocarbon deposit may be used to make decisions about (a) where not to drill wellbores or where to drill wellbores so as to avoid the hydrocarbon deposit, (b) how many wellbores to drill to avoid the hydrocarbon deposit, etc.

Advantageously, those of ordinary skill in the art will appreciate that the more accurate digital seismic image may be utilized in hydrocarbon exploration and hydrocarbon production for control. For example, the more accurate digital seismic image may be utilized to steer a tool (e.g., drilling tool) to drill a wellbore. Continuing with the hydrocarbon deposit example, a drilling tool may be steered to drill one or more wellbores to produce the hydrocarbon deposit or steered to avoid the hydrocarbon deposit depending on the desired outcome. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the formation, the wellbore, or any combination thereof. As another example, the more accurate digital seismic image may be utilized for controlling flow of fluids injected into or received from at least one hydrocarbon producing zone of the formation. Chokes or well control devices that are positioned on the surface, downhole, or any combination thereof may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Advantageously, those of ordinary skill in the art will appreciate that the more accurate digital seismic image may be utilized in hydrocarbon exploration and hydrocarbon production to select completions, components, fluids, etc. Continuing with the hydrocarbon deposit example, a variety of casing, tubing, packers, heaters, sand screens, gravel packs, items for fines migration, etc. may be selected for each wellbore to be drilled based on the more accurate digital seismic image. One or more hydrocarbon recovery processes to produce the hydrocarbon deposit may be selected based on the more accurate digital seismic image.

Thus, those of ordinary skill in the art will appreciate that the VTI anisotropy determined according to the principles of the present disclosure may be utilized to generate the more accurate digital seismic image for the hydrocarbon industry. In addition to seismic imaging of the formation discussed hereinabove, the VTI anisotropy may even be used for 4D seismic monitoring (also called time-lapse seismic, Life of Field seismic, and Permanent Reservoir Monitoring, among other names), etc. The more accurate digital seismic image may also replace a previously generated seismic image that is less accurate. The more accurate digital seismic image, or the determined VTI anisotropy, may even be used to correct a previously generated seismic image that is less accurate. Indeed, those of ordinary skill in the art will appreciate that there are many decisions (e.g., steering decisions, landing decisions, completion decisions, etc.) to make in the hydrocarbon industry and making proper decisions based on more accurate digital seismic images due to the VTI anisotropy determined according to the principles of the present disclosure should improve the likelihood of safe and reliable operations.

Advantageously, those of ordinary skill in the art will appreciate that the VTI anisotropy determined according to the principles of the present disclosure may be utilized to improve a fracture simulation, a fracturing process, or any combination thereof. For example, in the fracture simulation, the VTI anisotropy may be used to determine a more accurate fracture geometry (e.g., height and width), thereby improving the fracture simulation. Completions, components, fluids, etc. may be selected and used in the fracturing process based on the more accurate fracture geometry, thereby improving the fracturing process. As another example, the VTI anisotropy may even be utilized to select the type and/or size of proppants to use, to select the type of pressure to apply to create or extend fractures, to select the fracturing fluid, etc. Indeed, the VTI anisotropy may be used to select parameters for the fracture simulation and then use them in the fracturing process, such as, but not limited to, stages, clusters, fluids, proppants, where to initiate fractures, etc. In some embodiments, a computing system may use the determined VTI anisotropy along the horizontal section for a fracturing process, such as altering a computer related aspect or parameter of the fracturing process. In some embodiments, the determined VTI anisotropy along the horizontal section may be utilized to alter the fracturing process, for example, alter physical aspects of the fracturing process such as altering injection rate, altering location of the injection, altering proppants and/or fluid injected, etc. Thus, the determined VTI anisotropy along the horizontal section may be utilized in a computer context, in a physical/real world context, or any combination thereof depending on the embodiment.

In short, anisotropic effects are important in the hydrocarbon industry as they influence hydrocarbon exploration and hydrocarbon production, including subsurface modelling and subsurface interpretation. For example, the determined VTI anisotropy along the horizontal section of the wellbore controls wave propagation properties used in seismic imaging, predicting hydraulic fracture properties (e.g., fracture width, minimum horizontal stress, etc.), and many others. Of note, the principles of the present disclosure are also applicable in the case that the production wellbore is drilled close to the bedding plane and assuming that the anisotropic symmetry axis is aligned with the bedding direction.

SYSTEM OVERVIEW: Provided herein are embodiments of a system of determining a VTI anisotropy along a horizontal section of a wellbore drilled into a formation. In some embodiments, the system includes at least one sonic logging tool. In some embodiments, the system includes at least one density logging tool. In some embodiments, the system includes at least one computing system, such as a computer.

Sonic Logging Tool: A "sonic logging tool" refers to practically any tool configured to generate sonic log data. The sonic logging tool is placed downhole in the horizontal section of the wellbore drilled into the formation to measure seismic waves (e.g., acoustic waves) received at the sonic logging tool. For example, the sonic logging tool placed in the horizontal section may be utilized to (a) measure compressional slowness (DTCO) of the seismic waves (such as measured once for each depth), (b) measure vertically polarized shear slowness (DTSV) of the seismic waves (such as measured once for each depth), and (c) measure horizontally polarized shear slowness (DTSH) of the seismic waves (such as measured once for each depth), as well as utilized to generate sonic log data of the horizontal section. Thus, the sonic log data of the horizontal section comprises measurements of the compressional slowness (DTCO) of the horizontal section, the vertically polarized shear slowness (DTSV) of the horizontal section, and the horizontally polarized shear slowness (DTSH) of the horizontal section. As will be discussed further hereinbelow, the sonic log data of the horizontal section may be utilized to determine the elastic constant C11 of the horizontal section, the elastic constant C44 of the horizontal section, and the elastic constant C66 of the horizontal section.

Compressional slowness (DTCO) refers to one over the velocity or the time taken for a seismic wave to travel a unit of distance. Vertically polarized shear slowness (DTSV) refers to a shear wave that is polarized in the vertical plane containing the source and receiver positions. Horizontally polarized shear slowness (DTSH) refers to a shear wave whose polarization lies in the horizontal plane. DT refers to delta time, such as the time taken for a seismic wave to travel a unit distance (i.e., slowness).

Regarding components, the sonic logging tool includes at least one receiver, such as a receiver array, to receive the seismic waves, including recording the travel times of those seismic waves. The sonic logging tool may also be coupled to or include at least one processor (e.g., an embedded processor) for measurements (or calculations) based on the recorded travel times. For example, the at least one processor may be utilized for measuring the compressional slowness (DTCO) of the horizontal section, the vertically polarized shear slowness (DTSV) of the horizontal section, and the horizontally polarized shear slowness (DTSH) of the horizontal section, as well as generating the corresponding sonic log data of the horizontal section.

In some embodiments, the seismic waves may be generated in the horizontal section by the same sonic logging tool placed downhole in the horizontal section. For example, the sonic logging tool may include at least one source for generating the seismic waves. As an example, the sonic logging tool placed in the horizontal section may be utilized to generate and send seismic waves, such as 10 seismic waves, into the formation with the source(s). All or a subset of a portion of those seismic waves, such as 6 seismic waves, reflect back from the formation and the 6 seismic waves are received by the receiver(s). The sonic logging tool also includes the appropriate electronics for operation of the sonic logging tool.

In one embodiment, the sonic logging tool may include sources that are a mix of monopole and dipole sources located subsequent to (or below) the receiver array of the sonic logging tool such that the configuration, in series, is a wireline from the surface, then the receiver array, and then the mix of monopole and dipole sources. In one embodiment, the sonic logging tool may include a short monopole source prior to (or above) the receiver array. Examples of the sonic logging tool include, but are not limited to, a logging while drilling (LWD) tool, a tough logging conditions (TLC) tool, a cross dipole sonic logging tool, etc.

Regarding placement, the sonic logging tool may be placed downhole in the horizontal section via the wireline. The sonic logging tool may be pulled via the wireline from a first location in the horizontal section to a second location in the horizontal section while the sonic logging tool emits the seismic waves that travel from the source(s) of the sonic logging tool to the formation and back to the receiver(s) of the sonic logging tool. In one embodiment, the sonic logging tool is pulled from the first location that is closer to the toe (or at the toe) of the horizontal section to the second location that is closer to the heel (or at the heel) of the horizontal section, or vice versa. The first location and the second location may depend on the length of the horizontal section, where the seismic waves are desired in the horizontal section, where the seismic waves are desired in the formation, etc.

A second sonic logging tool, as discussed hereinabove, is placed downhole in the vertical wellbore to measure the second seismic waves that are received at the second sonic logging tool. For example, the second sonic logging tool placed in the vertical wellbore may be utilized to measure shear slowness (DTS) of the second seismic waves (such as measured once for each depth) and measure compressional slowness (DTCO) of the second seismic waves (such as measured once for each depth), as well as utilized to generate second sonic log data of the vertical wellbore. Thus, the second sonic log data of the vertical wellbore comprises measurements of the shear slowness (DTS) of the vertical wellbore and the compressional slowness (DTCO) of the vertical wellbore. As will be discussed further hereinbelow, the sonic log data of the vertical wellbore may be utilized to determine the elastic constant C33 of the vertical wellbore and the elastic constant C44 of the vertical wellbore.

In some embodiments, the horizontal section and the vertical wellbore are tens of feet away from each other. In some embodiments, the horizontal section and the vertical wellbore are hundreds of feet away from each other. In some embodiments, the horizontal section and the vertical wellbore are within 50 feet to 1000 feet away from each other. In some embodiments, the horizontal section and the vertical wellbore are within 50 feet to 500 feet away from each other. In some embodiments, the horizontal section and the vertical wellbore are within 50 feet to 250 feet away from each other. In some embodiments, the horizontal section and the vertical wellbore are at least 50 feet away from each other. In some embodiments, the horizontal section and the vertical wellbore are less than 1000 feet away from each other.

As discussed hereinabove, regarding components, the second sonic logging tool includes at least one receiver, such as a receiver array, to receive the second seismic waves, including recording the travel times of those second seismic waves. The second sonic logging tool may also be coupled to or include at least one processor (e.g., an embedded processor) for measurements (or calculations) based on the recorded travel times. For example, the at least one processor may be utilized for measuring the shear slowness (DTS) of the vertical wellbore and the compressional slowness (DTCO) of the vertical wellbore, as well as generating the corresponding second sonic log data of the vertical wellbore.

In some embodiments, the second seismic waves may be generated in the vertical wellbore by the same second sonic logging tool placed downhole in the vertical wellbore. For example, the second sonic logging tool may include at least one source for generating the second seismic waves. As an example, the second sonic logging tool placed in the vertical wellbore may be utilized to generate and send second seismic waves, such as 5 seismic waves, into the formation with the source(s). All or a subset of those second seismic waves, such as 4 seismic waves, reflect back from the formation and the 4 seismic waves are received by the receiver(s). The second sonic logging tool also includes the appropriate electronics for operation of the second sonic logging tool. Examples of the second sonic logging tool include, but are not limited to, a logging while drilling (LWD) tool, a tough logging conditions (TLC) tool, a cross dipole sonic logging tool, etc.

Regarding placement, the second sonic logging tool may be placed downhole in the vertical wellbore via a second wireline. The second sonic logging tool may be pulled via the second wireline from a first location in the vertical wellbore to a second location in the vertical wellbore while the second sonic logging tool emits the second seismic waves that travel from the source(s) of the second sonic logging tool to the formation and back to the receiver(s) of the second sonic logging tool. In one embodiment, the second sonic logging tool is pulled from the first location that is closer to the bottom of the vertical wellbore to the second location that is closer to the top of the vertical wellbore (or surface), or vice versa. The first location and the second location may depend on the length of the vertical wellbore, where the second seismic waves are desired in the vertical wellbore, where the second seismic waves are desired in the formation, etc.

The sonic log data of the horizontal section and the second sonic log data of the vertical wellbore may be generated concurrently (e.g., with a first sonic logging tool in the horizontal section and a different second sonic logging tool in the vertical wellbore) in some embodiments. Concurrently may be simultaneously in some embodiments. Alternatively, the sonic log data of the horizontal section and the second sonic log data of the vertical wellbore may not be generated concurrently. For example, a particular sonic logging tool may be used in the vertical wellbore and then a different sonic logging tool may be used in the horizontal section (or vice versa) at a later time, such as days later, weeks later, months later, or even years later. For example, a particular sonic logging tool may be used in the vertical wellbore and then the same sonic logging tool may be used in the horizontal section (or vice versa) at a later time, such as days later, weeks later, months later, or even years later. The same or different wireline may be utilized depending on the embodiment.

Multiple sonic log data sets may also be generated for the horizontal section in some embodiments. Multiple sonic log data sets may also be generated for the vertical wellbore in some embodiments. The sonic log data available for the horizontal section may even be combined with other sonic log data available for the horizontal section. The sonic log data available for the vertical wellbore may even be combined with other sonic log data available for the vertical wellbore. Moreover, sonic log data from multiple wellbores may even be generated, combined, and/or utilized. For example, if multiple vertical wellbores are drilled into the formation, then sonic log data may be generated and used from those multiple vertical wellbores as described herein for the vertical wellbore.

In short, the sonic log data available for the horizontal section may be in one or more sonic logs, such as in one or more cross dipole sonic logs. The second sonic log data available for the vertical wellbore may be in one or more sonic logs, such as in one or more cross dipole sonic logs. Those of ordinary skill in the art will appreciate that it may be advantageous to use the most accurate sonic log data available for the horizontal section and the most accurate sonic log data available for the vertical section to increase the accuracy of the VTI anisotropy determined for the horizontal section.

Furthermore, the sonic log data available for the horizontal section, the second sonic log data available for the vertical section, or any combination may be modified to improve it. For example, a processor, a computing system, a computer, etc. may be utilized to improve sonic log data (e.g., processing sonic log data), for further calculations, etc. The sonic log data of the horizontal section, the second sonic log data of the vertical wellbore, or any combination thereof may be modified in the respective sonic logging tool in some embodiments. The sonic log data of the horizontal section, the second sonic log data of the vertical wellbore, or any combination thereof may be modified after it leaves the respective sonic logging tool in some embodiments. The sonic log data of the horizontal section, the second sonic log data of the vertical wellbore, or any combination thereof may be modified in the respective sonic logging tool and after it leaves the respective sonic logging tool in some embodiments. In short, the sonic log data of the horizontal section and the second sonic log data of the vertical wellbore may comprise data directly from the respective sonic logging tool, modified data (e.g., processed data), a combination of data sets, or any combination thereof, for example, depending on the embodiment.

Density Logging Tool: A "density logging tool" refers to practically any tool configured to generate density log data. The density logging tool is placed downhole in the horizontal section of the wellbore drilled into the formation to measure gamma rays detected at the density logging tool. The density log data of the horizontal section may be utilized to determine the elastic constant C11 of the horizontal section, the elastic constant C44 of the horizontal section, and the elastic constant C66 of the horizontal section.

Regarding components, the density logging tool includes at least one detector to detect the gamma rays and directly measure the gamma rays that are detected at the density logging tool. The density logging tool may also be coupled to or include at least one processor (e.g., an embedded processor) for measurements (or calculations) regarding the count-rate of scattered gamma rays detected by the density logging tool, as well as generating the corresponding density log data of the horizontal section. For example, density log data may be measured approximately every 6 inches in the horizontal section.

In some embodiments, the gamma rays may be generated in the horizontal section by the same density logging tool placed downhole in the horizontal section. For example, the density logging tool may include at least one source for generating the gamma rays. As an example, the density logging tool placed in the horizontal section may be utilized to generate and send 3 gamma rays into the formation with the source(s). All or a subset of those gamma rays, such as 2 gamma rays, scatter back from the formation and are detected by the detector(s). Gamma rays interact with electrons in the formation and the interaction causes them to be scattered or absorbed. Some gamma rays are scattered back towards the horizontal section. The detector(s) detect this "back-scattering" and a count-rate of scattered gamma rays returning to the density logging tool is determined. The density log data may include the count-rate data. The density logging tool also includes the appropriate electronics for operation of the density logging tool. In one embodiment, the density logging tool may include the following configuration, in series, a wireline from the surface, then at least one detector, and then at least one source. One example of the density logging tool includes, but is not limited to, a lithodensity tool (LDT).

Regarding placement, the density logging tool may be placed downhole in the horizontal section via the wireline. The density logging tool may be pulled via the wireline from a first location in the horizontal section to a second location in the horizontal section while the density logging tool emits the gramma rays that travel from the source(s) of the density logging tool to the formation and a subset of those gamma rays that scatter back from the formation are detected by the detector(s) of the density logging tool. In one embodiment, the density logging tool is pulled from the first location that is closer to the toe (or at the toe) of the horizontal section to the second location that is closer to the heel (or at the heel) of the horizontal section, or vice versa. The first location and the second location may depend on the length of the horizontal section, where the gamma rays are desired in the horizontal section, where the gamma rays are desired in the formation, etc.

A second density logging tool, as discussed hereinabove, is placed downhole in the vertical wellbore drilled into the formation to measure second gamma rays detected at the second density logging tool. In some embodiments, the second density log data of the vertical wellbore may be utilized to determine the elastic constant C33 of the vertical wellbore and the elastic constant C44 of the vertical wellbore.

As discussed hereinabove, regarding components, the second density logging tool includes at least one detector to detect the second gamma rays and directly measure the second gamma rays that are detected at the second density logging tool. The second density logging tool may also be coupled to or include at least one processor (e.g., an embedded processor) for measurements (or calculations) regarding the second count-rate of second scattered gamma rays detected by the second density logging tool, as well as generating the corresponding second density log data of the vertical. For example, second density log data may be measured approximately every 6 inches in the vertical wellbore.

In some embodiments, the second gamma rays may be generated in the vertical wellbore by the same second density logging tool placed downhole in the vertical wellbore. For example, the second density logging tool may include at least one source for generating the second gamma rays. As an example, the second density logging tool placed in the vertical wellbore may be utilized to generate and send second gamma rays, such as 7 gamma rays, into the formation with the source(s). All or a subset of those second gamma rays, such as 5 gamma rays, scatter back from the formation and are detected by the detector(s). The detector(s) detect this "back-scattering" and a second count-rate of scattered gamma rays returning to the density logging tool is determined. The second density log data may include the second count-rate data. The second density logging tool also includes the appropriate electronics for operation of the second density logging tool. In one embodiment, the second density logging tool may include the following configuration, in series, a wireline from the surface, then at least one detector, and then at least one source. One example of the second density logging tool includes, but is not limited to, a lithodensity tool (LDT).

Regarding placement, the second density logging tool may be placed downhole in the vertical wellbore via the wireline. The second density logging tool may be pulled via the wireline from a first location in the horizontal section to a second location in the vertical wellbore while the second density logging tool emits the second gamma rays that travel from the source(s) of the second density logging tool to the formation and a subset of those second gamma rays that scatter back from the formation are detected by the detector(s) of the second density logging tool. In one embodiment, the second density logging tool is pulled from the first location that is closer to the bottom of the vertical wellbore to the second location that is closer to the top of the vertical wellbore (or surface). The first location and the second location may depend on the length of the vertical wellbore, where the second gamma rays are desired in the vertical wellbore, where the second gamma rays are desired in the formation, etc.

The density log data of the horizontal section and the second density log data of the vertical wellbore may be generated concurrently (e.g., with a first density logging tool in the horizontal section and a different second density logging tool in the vertical wellbore) in some embodiments. Concurrently may be simultaneously in some embodiments. Alternatively, the density log data of the horizontal section and the second density log data of the vertical wellbore may not be generated concurrently. For example, a particular density logging tool may be used in the vertical wellbore and then a different density logging tool may be used in the horizontal section (or vice versa) at later time, such as days later, weeks later, months later, or even years later. For example, a particular density logging tool may be used in the vertical wellbore and then the same density logging tool may be used in the horizontal section (or vice versa) at a later time, such as days later, weeks later, months later, or even years later. The same or different wireline may be utilized depending on the embodiment.

In some embodiments, either the density logging tool or the sonic logging tool reside in the horizontal section, but both tools do not reside concurrently in the horizontal section. For example, the density logging tool may be placed in the horizontal section after the sonic logging tool has been removed from the horizontal section (or vice versa). Similarly, in some embodiments, either the second density logging tool or the second sonic logging tool reside in the vertical wellbore, but both tools do not reside concurrently in the vertical wellbore. For example, the second density logging tool may be placed in the vertical wellbore after the second sonic logging tool has been removed from the vertical wellbore (or vice versa).

Alternatively, in some embodiments, the density logging tool and the sonic logging tool may both reside concurrently in the horizontal section. For example, the density logging tool and the sonic logging tool may be stacked or coupled such that both tools may reside concurrently in the horizontal section. Similarly, in some embodiments, the second density logging tool and the second sonic logging tool may both reside concurrently in the vertical wellbore. For example, the second density logging tool and the second sonic logging tool may be stacked or coupled such that both tools may reside concurrently in the vertical wellbore.

Multiple density log data sets may also be generated for the horizontal section in some embodiments. Multiple density log data sets may also be generated for the vertical wellbore in some embodiments. The density log data available for the horizontal section may even be combined with other density log data available for the horizontal section. The density log data available for the vertical wellbore may even be combined with other density log data available for the vertical wellbore. Moreover, density log data from multiple wellbores may even be generated, combined, and/or utilized. For example, if multiple vertical wellbores are drilled into the formation, then density log data may be generated and used from those multiple vertical wellbores as described herein for the vertical wellbore.

In short, the density log data available for the horizontal section may be in one or more density logs. The density log data available for the vertical wellbore may be in one or more density logs. Those of ordinary skill in the art will appreciate that it may be advantageous to use the most accurate density log data available for the horizontal section and the most accurate density log data available for the vertical wellbore to increase the accuracy of the VTI anisotropy determined along the horizontal section.

Furthermore, the density log data available for the horizontal section, the second density log data available for the vertical wellbore, or any combination may be modified to improve it. For example, a processor, a computing system, a computer, etc. may be utilized to process it, improve it, for further calculations, etc. As an example, calibration data may be applied to density log data and formation bulk densities may be obtained directly from the resulting calibration curves. As an example, at least one smoothing technique or other correction may also be applied to density log data (or calibrated density log data). The density log data of the horizontal section, the second density log data of the vertical wellbore, or any combination thereof may be modified in the respective density logging tool in some embodiments. The density log data of the horizontal section, the second density log data of the vertical wellbore, or any combination thereof may be modified after it leaves the respective density logging tool in some embodiments. The density log data of the horizontal section, the second density log data of the vertical wellbore, or any combination thereof may be modified in the respective density logging tool and after it leaves the respective density logging tool in some embodiments. In short, the density log data of the horizontal section and the second density log data of the vertical wellbore may comprise data directly from the respective density logging tool, modified data (e.g., processed data), a combination of data sets, or any combination thereof, for example, depending on the embodiment.

Of note, in some embodiments, the density logging tool of the horizontal section may also be configured to emit neutrons from a source, measure hydrogen concentration in the formation, and generate neutron log data. Thus, the density log data of the horizontal section may even include neutron log data in some embodiments. Similarly, the second density logging tool placed in the vertical wellbore may also be configured to emit neutrons and therefore the second density log data of the horizontal section may even include second neutron log data in some embodiments.

Figure 1B:
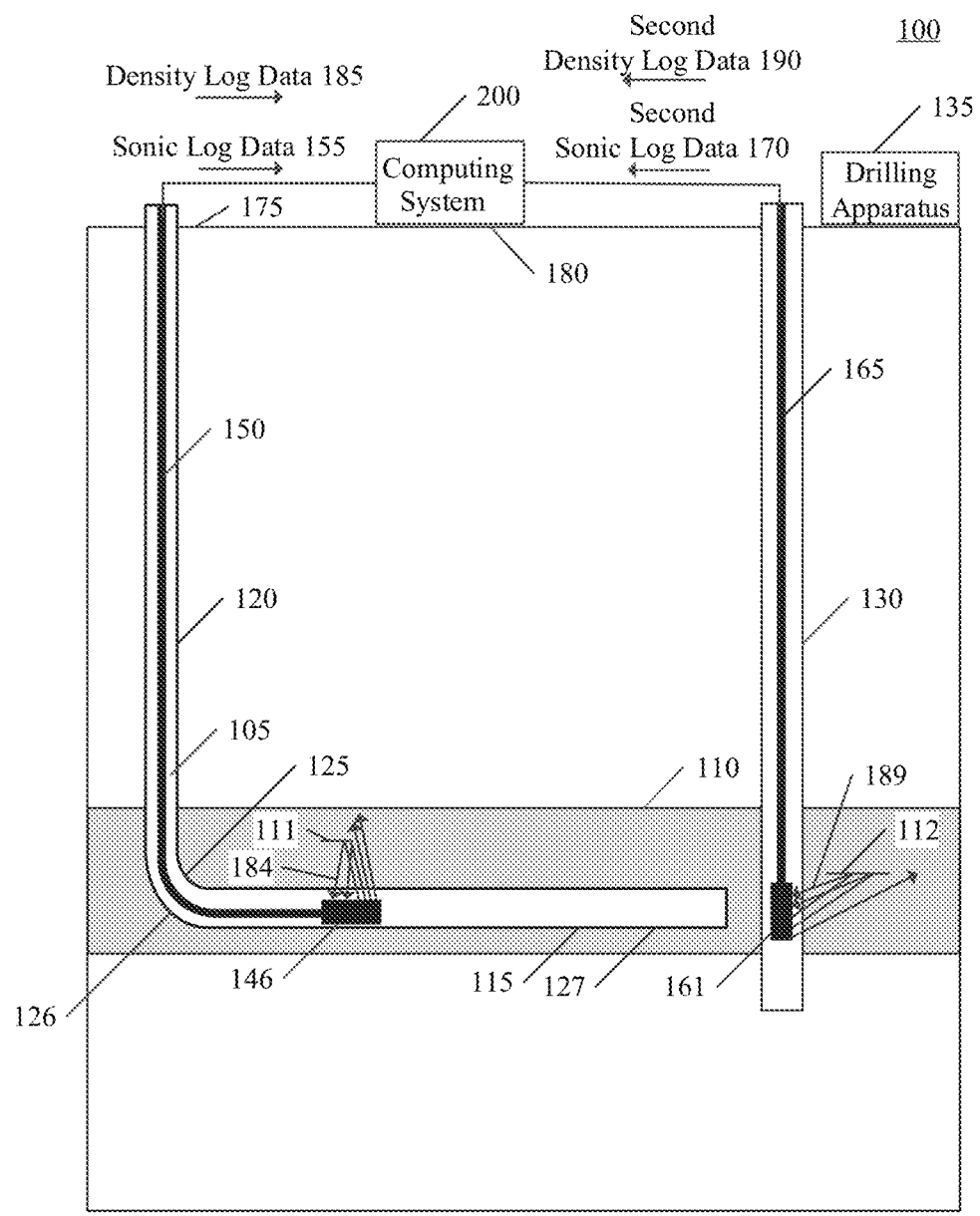

Turning to FIGS. 1A-1B, this figure provides an embodiment of a system 100 for determining a VTI anisotropy along a horizontal section of a wellbore drilled into a formation. FIG. 1 illustrates at least one wellbore 105 drilled into a formation 110 with a horizontal section 115, a vertical section 120, and a curved section 125 (sometimes called a build section) between the horizontal section 115 and the vertical section 120. The formation 110 includes at least one formation feature, such as formation features 111-112. The curved section 125 is referred to as a heel 126 and the area at the other end of the horizontal section 115 is referred to as a toe 127. FIG. 1 also illustrates at least one vertical wellbore 130 drilled into the formation 110. The vertical wellbore 130 is a couple of hundred feet away from the horizontal section 115. The formation 110 may be an unconventional formation involving a fracturing process or other type of formation.

The wellbores 105, 130 may be drilled with a drilling apparatus 135. The drilling apparatus 135 may include a drill bit, a drill string, etc. The drilling apparatus 135 may be utilized to drill at least one other wellbore based on the determined VTI anisotropy, the more accurate seismic images that may be generated, etc. The wellbore 105, the wellbore 130, or any combination thereof may comprise cement, surface casing, production casing, etc.

As discussed hereinabove, a sonic logging tool and a density logging tool may reside concurrently in a wellbore in some embodiments. Alternatively, in some embodiments, the sonic logging tool and the density logging tool do not reside concurrently in a wellbore, and this option is illustrated in FIGS. 1A-1B.

For ease of understanding, sonic logging tool 145 placed in the horizontal section 115 via a wireline 150 generates seismic waves 154, measures the seismic waves 154 that reflect back from the formation 110 (such as reflect back from the formation feature 111), and generates sonic log data 155 of the horizontal section 115. The sonic log data 155 of the horizontal section 115 comprises the measured compressional slowness (DTCO), the measured vertically polarized shear slowness (DTSV), and the measured horizontally polarized shear slowness (DTSH).

For ease of understanding, a second sonic logging tool 160 placed in the vertical wellbore 130 via a second wireline 165 generates second seismic waves 169, measures the seismic waves 169 that reflect back from the formation 110 (such as reflect back from the formation feature 112), and generates second sonic log data 170 of the vertical wellbore 130. The second sonic log data 170 of the vertical wellbore 130 comprises the measured shear slowness (DTS) and the measured compressional slowness (DTCO).

The sonic log data 155 of the horizontal section 115 and the second sonic log data 170 of the vertical wellbore 130 may be received at a computing system 200 at a location on a surface 175 (e.g., a location 180) by a wired connection, a wireless connection, a combination of a wired connection and a wireless connection, or practically any communication or transmission methodology known in the art. The computing system 200 may utilize the sonic log data 155, the second sonic log data 170, or any combination thereof in determining the VTI anisotropy along the horizontal section 115. In some embodiments, the sonic log data 155 of the horizontal section 115, the second sonic log data 170 of the vertical wellbore 130, or any combination thereof may be processed before it is received at the computing system 200. In some embodiments, the sonic log data 155 of the horizontal section 115, the second sonic log data 170 of the vertical wellbore 130, or any combination thereof may be processed after it is received at the computing system 200. In some embodiments, the sonic log data 155 of the horizontal section 115, the second sonic log data 170, or any combination thereof may be processed before and after it is received at the computing system 200. The processed data may be utilized in determining the VTI anisotropy along the horizontal section 115.

In a similar manner, a density logging tool 146 placed in the horizontal section 115 via the wireline 150 generates gamma rays 184, measures the gamma rays 184 that scatter back from the formation 110, and generates density log data 185 of the horizontal section 115. A second density logging tool 161 placed in the vertical wellbore 130 via the second wireline 165 generates second gamma rays 189, measures the second gamma rays 189 that scatter back from the formation 110, and generates second density log data 190 of the vertical wellbore 130.

The density log data 185 of the horizontal section 115 and the second density log data 190 of the vertical wellbore 130 may be received at the computing system 200, at the location on the surface 175 (e.g., the location 180) by a wired connection, a wireless connection, a combination of a wired connection and a wireless connection, or practically any communication or transmission methodology known in the art. The computing system 200 may utilize the density log data 185, the second density log data 190, or any combination thereof in determining the VTI anisotropy along the horizontal section 115. In some embodiments, the density log data 185 of the horizontal section 115, the second density log data 190 of the vertical wellbore 130, or any combination thereof may be processed before it is received at the computing system 200. In some embodiments, the density log data 185 of the horizontal section 115, the second density log data 190 of the vertical wellbore 130, or any combination thereof may be processed after it is received at the computing system 200. In some embodiments, the density log data 185 of the horizontal section 115, the second density log data 190 of the vertical wellbore 130, or any combination thereof may be processed before and after it is received at the computing system 200. The processed data may be utilized in determining the VTI anisotropy along the horizontal section 115.

After the tools 145, 146 are removed, the wellbore 105 with the horizontal section 115 may be utilized in a fracturing process or other hydrocarbon recovery process. Similarly, after the tools 160,161 are removed, the vertical wellbore 130 may also be utilized in a hydrocarbon recovery process. Hydrocarbons from the formation 110 may flow into the wellbore 105, the wellbore 130, or any combination thereof, and up towards the surface 175 for refining, transporting, etc.

Those of ordinary skill in the art will appreciate that some embodiments may have a different quantity of an item than the illustrated quantity, including quantity of zero such that an item may not be present. For example, although one vertical wellbore 130 is illustrated, some embodiments may include a plurality of vertical wellbores drilled into the formation 110 and sonic log data from the plurality of vertical wellbores may be measured and used to determine the VTI anisotropy along the horizontal section 115. As another example, the quantity of seismic waves and gamma rays may be different than illustrated. Similarly, some embodiments may have an item in a different location than illustrated.

Figure 2:
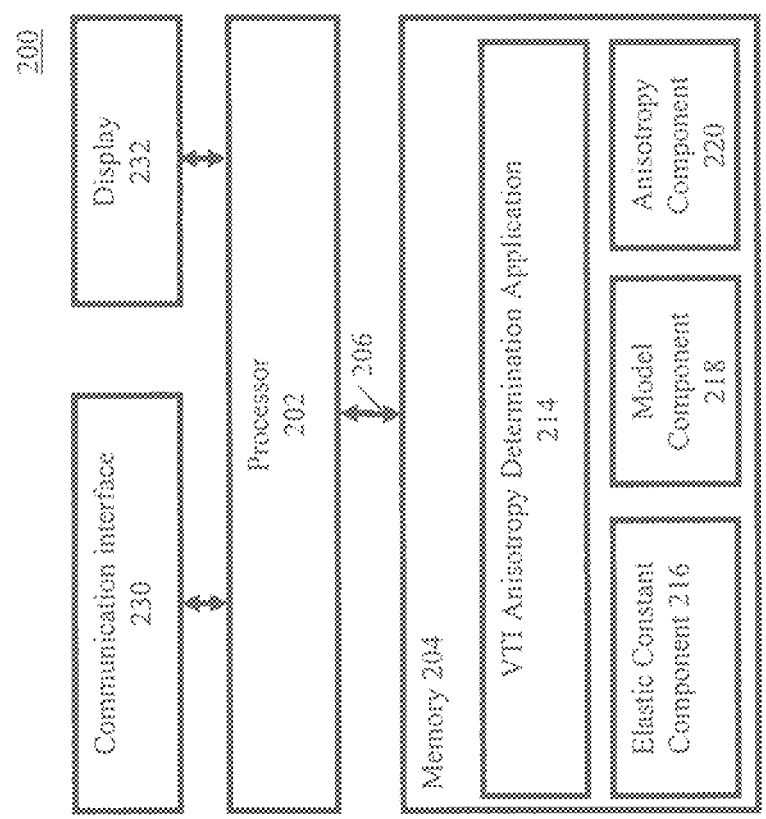
FIG. 2 illustrates one embodiment of a computing system of determining a VTI anisotropy along a horizontal section of a wellbore drilled into a formation.

Computing System: FIG. 2 illustrates one embodiment of the computing system 200 of determining a VTI anisotropy along a horizontal section of a wellbore drilled into a formation. For example, the computing system 200 receives the sonic log data 155 of the horizontal section 115, the second sonic log data 170 of the vertical wellbore 130, the density log data 185 of the horizontal section 115, and the second density log data 190 of the vertical wellbore 130, as well as determines the VTI anisotropy along the horizontal section using the received data. The discussion refers to reference numbers in FIGS. 1A-1B.

The computing system 200 includes a processor 202 communicatively connected to a memory 204 via a data bus 206. The processor 202 may be any of a variety of types of programmable circuits capable of executing computer-readable instructions to perform various tasks, such as mathematical and communication tasks. The computing system 200 may comprise a computer, a phone, a tablet, a laptop, a wireless device, a wired device, a plurality of networked devices, etc. In some embodiments, the computing system 200 represents at least one computer.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. In example embodiments, the computer storage medium is embodied as a computer storage device, such as a memory or mass storage device. In particular embodiments, the computer-readable media and computer storage media of the present disclosure comprise at least some tangible devices, and in specific embodiments such computer-readable media and computer storage media include exclusively non-transitory media. By way of example, the memory 204 may comprise dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

In the illustrated embodiment, the memory stores a VTI anisotropy determination application 214. The VTI anisotropy determination application 214 determines the VTI anisotropy along the horizontal section. In the embodiments shown, the VTI anisotropy determination application 214 includes an elastic constant component 216, a model component 218, and an VTI anisotropy component 220. The VTI anisotropy determination application 214 may be an application in some embodiments or some other data processing framework.

In the illustrated embodiment, the elastic constant component 216 receives the sonic log data of the horizontal section and determines elastic constants using the sonic log data of the horizontal section (e.g., the sonic log data 155 of the horizontal section 115). For example, the elastic constant component 216 determines an elastic constant C11 using the measured compressional slowness (DTCO) of the horizontal section, determines an elastic constant C44 using the measured vertically polarized shear slowness (DTSV) of the horizontal section, and determines an elastic constant C66 using the measured horizontally polarized shear slowness (DTSH) of the horizontal section. The elastic component 216 also receives the density log data of the horizontal section and determines the elastic constants using the density log data of the horizontal section (e.g., the density log data 185 of the horizontal section 115). C11 is the elastic constant representing the elastic stiffness tensor component C1111. C44 is the elastic constant representing the elastic stiffness tensor component C2323. C66 is the elastic constant representing the elastic stiffness tensor component C1212.

In the illustrated embodiment, the elastic constant component 216 also receives the second sonic log data of the vertical wellbore and determines elastic constants using the second sonic log data of the vertical wellbore (e.g., the second sonic log data 170 of the vertical wellbore 130). For example, the elastic constant component 216 determines an elastic constant C33 of the vertical wellbore using the compressional slowness (DTCO) measured in the vertical wellbore and determines an elastic constant C44 of the vertical wellbore using the shear slowness (DTS) measured in the vertical wellbore. The elastic component 216 also receives the second density log data of the vertical wellbore and determines the elastic constants using the second density log data of the vertical wellbore (e.g., the second density log data 190 of the vertical wellbore 130). C33 is the elastic constant representing the elastic stiffness tensor C3333. C44 is the elastic constant representing the elastic stiffness tensor component C2323.

In the illustrated embodiment, the model component 218 determines a vertical compressional slowness of the horizontal section corresponding to an elastic constant C33 of the horizontal section using a model with a condition. The model (e.g., a regression model) is built using second sonic log data and the second density log data of the vertical wellbore (e.g., the second sonic log data 170 of the vertical wellbore 130). The second sonic log data of the vertical wellbore comprises shear slowness (DTS) measured in the vertical wellbore and compressional slowness (DTCO) measured in the vertical wellbore. The condition is that the shear slowness (DTS) of the vertical wellbore is equal to the vertically polarized shear slowness (DTSV) of the horizontal section.

In the illustrated embodiment, the anisotropy component 220 determines the VTI anisotropy along the horizontal section. For example, the anisotropy component 220 may use the elastic constants C11, C44, C66, and C33 to determine the VTI anisotropy along the horizontal section, such as by determining at least one Thomsen anisotropy parameter (e.g., Thomsen epsilon ($\varepsilon$), Thomsen gamma ($\gamma$), Thomsen delta ($\delta$), or any combination thereof).

Those of ordinary skill in the art will appreciate that various modification may be made to the VTI anisotropy determination application 214. For example, the elastic constant component 216 may even determine an elastic constant C13 of the horizontal section using (a) Stoneley mode; (b) an empirical relationship between the elastic constant C11 of the horizontal section, the elastic constant C44 of the horizontal section, the elastic constant C66 of the horizontal section, the elastic constant C33 of the horizontal section, or (c) any combination thereof, or any combination thereof. The VTI anisotropy component 220 may use the elastic constant C13 of the horizontal section in determining the VTI anisotropy along the horizontal section. C13 is the elastic constant representing the elastic stiffness tensor C1133.

In some embodiments, one or more components may allow the user to provide user input. In some embodiments, some components may be combined into a single component or fewer components. Alternatively, the VTI anisotropy determination application 214 may not have any separate components. In some embodiments, the VTI anisotropy determination application 214 may interact with software, hardware, or both from a third party.

The computing system 200 may also include a communication interface 230 configured to, for example, receive the sonic log data and the density log data of the horizontal section, as well receive the second sonic log data and the second density log data of at least one vertical wellbore for determining the VTI anisotropy along the horizontal section. The communication interface 230 may also be utilized to transmit notifications as generated by the VTI anisotropy determination application 214.

The computing system 220 may comprise a display 232 for presenting a user interface associated with the VTI anisotropy determination application 214. In various embodiments, the computing system 200 can include additional components, such as peripheral I/O devices, for example to allow a user to interact with the user interfaces generated by the VTI anisotropy determination application 214. For example, the display 232 and the peripheral I/O devices may allow a user to provide user input, view and/or manipulate visual output, view and/or manipulate visual output of the VTI anisotropy along the horizontal section that is determined, view and/or manipulate visual output of at least one elastic constant that is determined, view and/or manipulate the model built for determining the VTI anisotropy along the horizontal section, view and/or manipulate the sonic log data and/or the density log data of the horizontal section, view and/or manipulate the second sonic log data and/or the second density log data of at least one vertical wellbore, or other functionality. In various embodiments, the computing system 200 may even allow for interaction with at least one other software item, at least one other hardware item, or both (e.g., software or hardware items from third parties).

In short, those of ordinary skill in the art will appreciate that various modifications may be made to the embodiments provided herein and the scope of the claims is not limited to the discussion herein. Embodiments of the present disclosure may be implemented as a system (e.g., a computer system or system comprising a computer), a method (e.g., a process, a computer process or computer method, etc.), an article of manufacture (e.g., computer readable medium or computer storage medium), etc.

VTI Anisotropy Determination and Example1

Figure 3B:
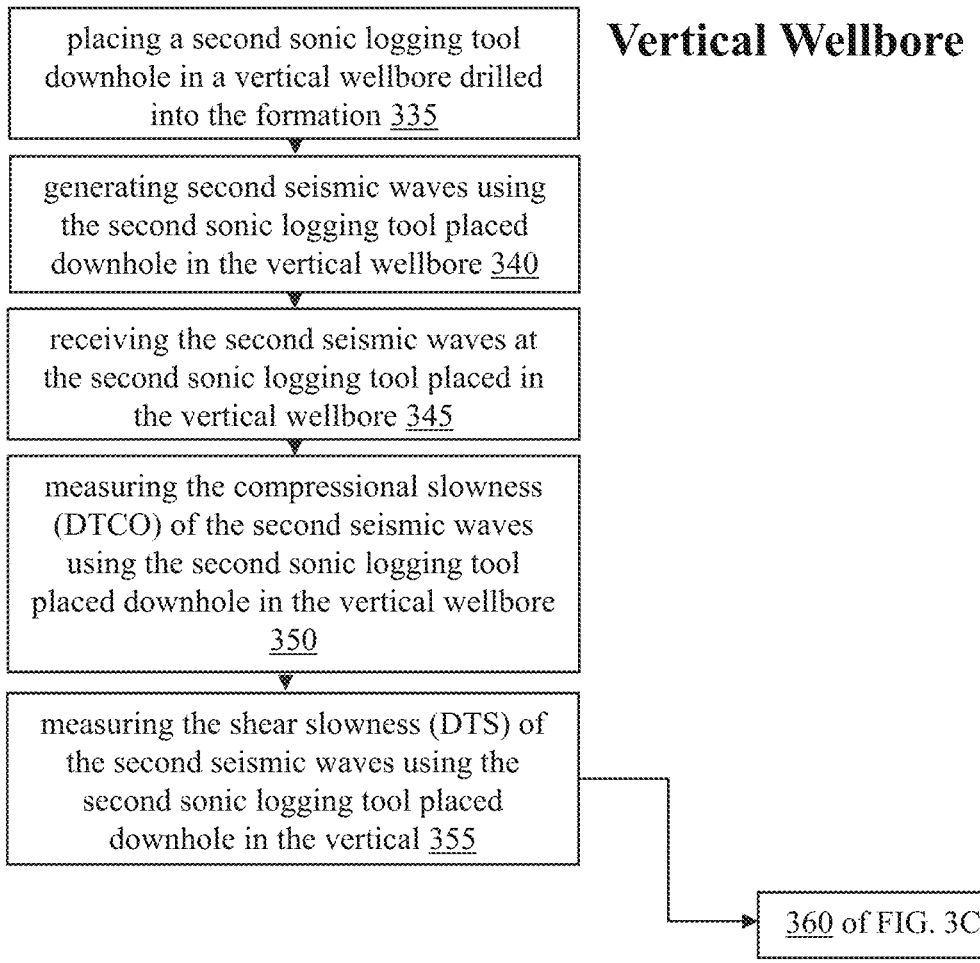
Figure 3C:
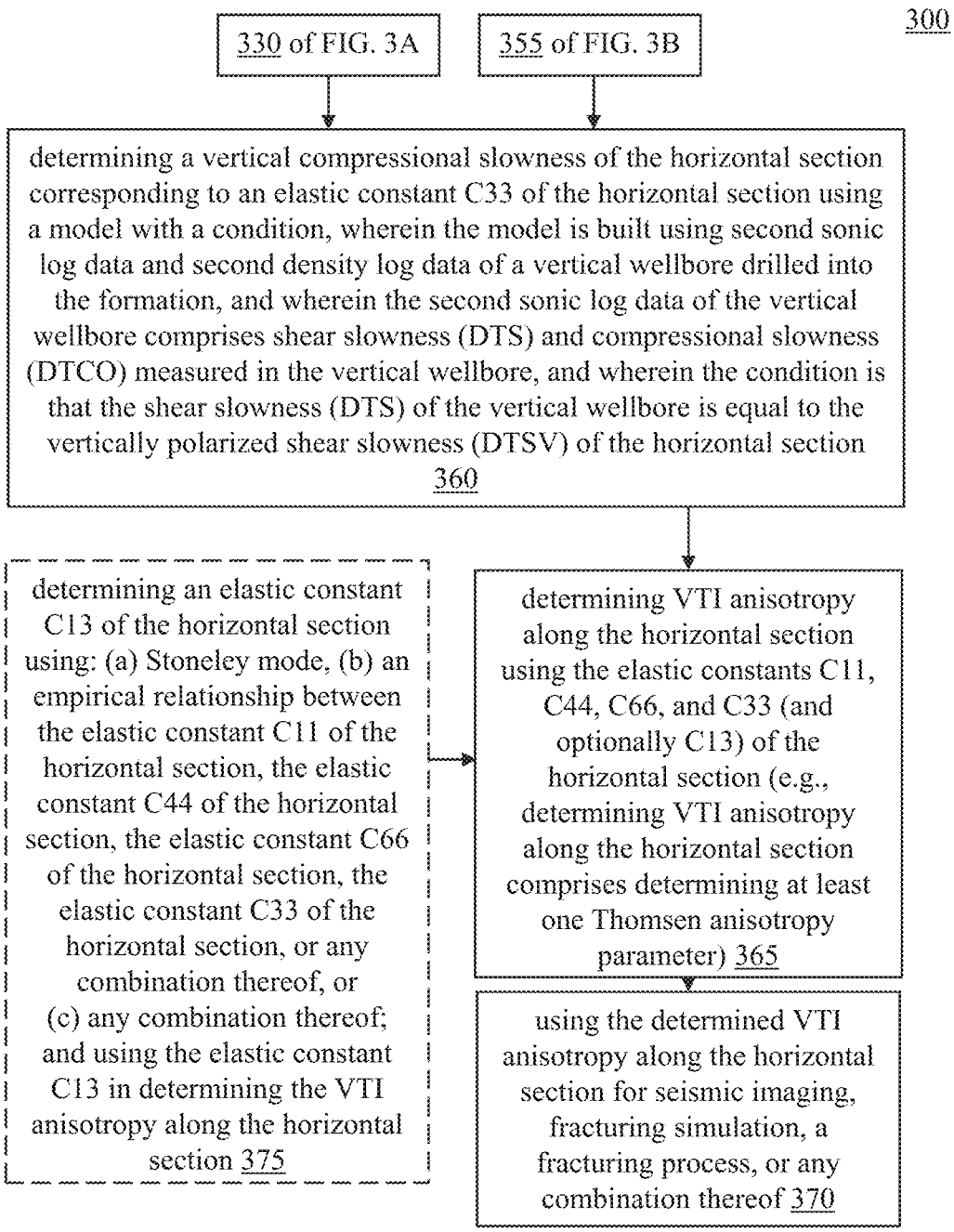

Turning to FIGS. 3A-3C, this figure illustrates one embodiment of a method of determining VTI anisotropy along a horizontal section of a wellbore drilled into a formation, referred to as a method 300, in accordance with the disclosure. The method 300 may be executed by the tools 145, 146, 160, and 161 of FIGS. 1A-1B and the computing system 200 of FIG. 2. The discussion refers to reference numbers in FIGS. 1A-1B, 2, and 4-7, as well as Example1.

At 305, the method 300 includes placing a sonic logging tool downhole in a horizontal section of a wellbore drilled into a formation. For example, the sonic logging tool 145 may be placed downhole in the horizontal section 115 of the wellbore 105 drilled into the formation 110.

At 310, the method 300 includes generating the seismic waves using the sonic logging tool placed downhole in the horizontal section. For example, the seismic waves 154 may be generated using at least one source of the sonic logging tool 145 placed downhole in the horizontal section 115.

At 315, the method 300 includes receiving the seismic waves at the sonic logging tool placed downhole in the horizontal section. For example, all or a subset of the generated seismic waves 154 that reflect back from the formation 110 are received by at least one receiver of the sonic logging tool 145.

At 320, the method 300 includes measuring compressional slowness (DTCO) of the seismic waves using the sonic logging tool placed downhole in the horizontal section and determining an elastic constant C11 of the horizontal section using the compressional slowness (DTCO) and density log data measured in the horizontal section. At 325, the method 300 includes measuring vertically polarized shear slowness for the acoustic waves using the sonic logging tool placed downhole in the horizontal section and determining an elastic constant C44 of the horizontal section using the vertically polarized shear slowness (DTSV) and the density log data measured in the horizontal section. At 330, the method 300 includes measuring horizontally polarized shear slowness for the acoustic waves using the sonic logging tool placed downhole in the horizontal section and determining an elastic constant C66 of the horizontal section using the horizontally polarized shear slowness (DTSH) and the density log data measured in the horizontal section. For example, the sonic logging tool 145 measures the compressional slowness (DTCO), the vertically polarized shear slowness (DTSV), and the horizontally polarized shear slowness (DTSH), such as measured once for each depth, for the generated acoustic waves 154 received at the sonic logging tool 145. The sonic logging tool 145 generates the sonic log data 155 of the horizontal section 115.

Density log data of the horizontal section 115 may also be utilized to determine the elastic constants C11, C44, and C66 of the horizontal section 115. Of note, density log data used to determine the elastic constant C11 of the horizontal section 115 may be different than density log data used to determine the elastic constant C66 (and the elastic constant C44) of the horizontal section 115, as density log data may be measured every 6 inches along the horizontal section 115.

FIG. 4 illustrates one embodiment of a method 400 of generating density log data of a horizontal section of a wellbore drilled into a formation. The method 400 comprises: placing a density logging tool downhole in the horizontal section at 405, generating gamma rays using the density logging tool placed downhole in the horizontal section at 410, receiving all or a subset of the gamma rays that scatter back at the density logging tool placed downhole in the horizontal section and measuring the gamma rays using the density logging tool downhole in the horizontal section to generate density log data of the horizontal section at 415, and generating the density log data of the horizontal section at 420. For example, the density log data 155 of the horizontal section 115 may be generated. As another example, the computing system 200 may be utilized to improve the density log data 155. Calibration data may be applied to density log data 155 using the computing system 200 and formation bulk densities may be obtained directly from the resulting calibration curves. As an example, at least one smoothing technique or other correction may also be applied to the density log data 155 (or calibrated density log data) using the computing system 200.

Returning to 320-330 of FIGS. 3A-3C, from these slownesses and the density log data of horizontal section, the elastic constants C11, C44, and C66 of the horizontal section may be determined by the computing system 200 using the following equations:

$$C11 = \frac{\rho}{S_{DTCO}^2} \quad \text{Equation 1}$$

$$C44 = \frac{\rho}{S_{DTSV}^2} \quad \text{Equation 2}$$

$$C66 = \frac{\rho}{S_{DTSH}^2} \quad \text{Equation 3}$$

wherein $\rho$ is the density log data of the horizontal section, and wherein $S_{DTCO}$ is the compressional slowness (DTCO) measured in the horizontal section, $S_{DTSV}$ is the vertically polarized shear slowness (DTSV) measured in the horizontal section, and $S_{DTSH}$ is the horizontally polarized shear slowness (DTSH) measured in the horizontal section. The DTCO, DTSV, and DTSH come from the sonic log data of the horizontal section.

Figure 6:
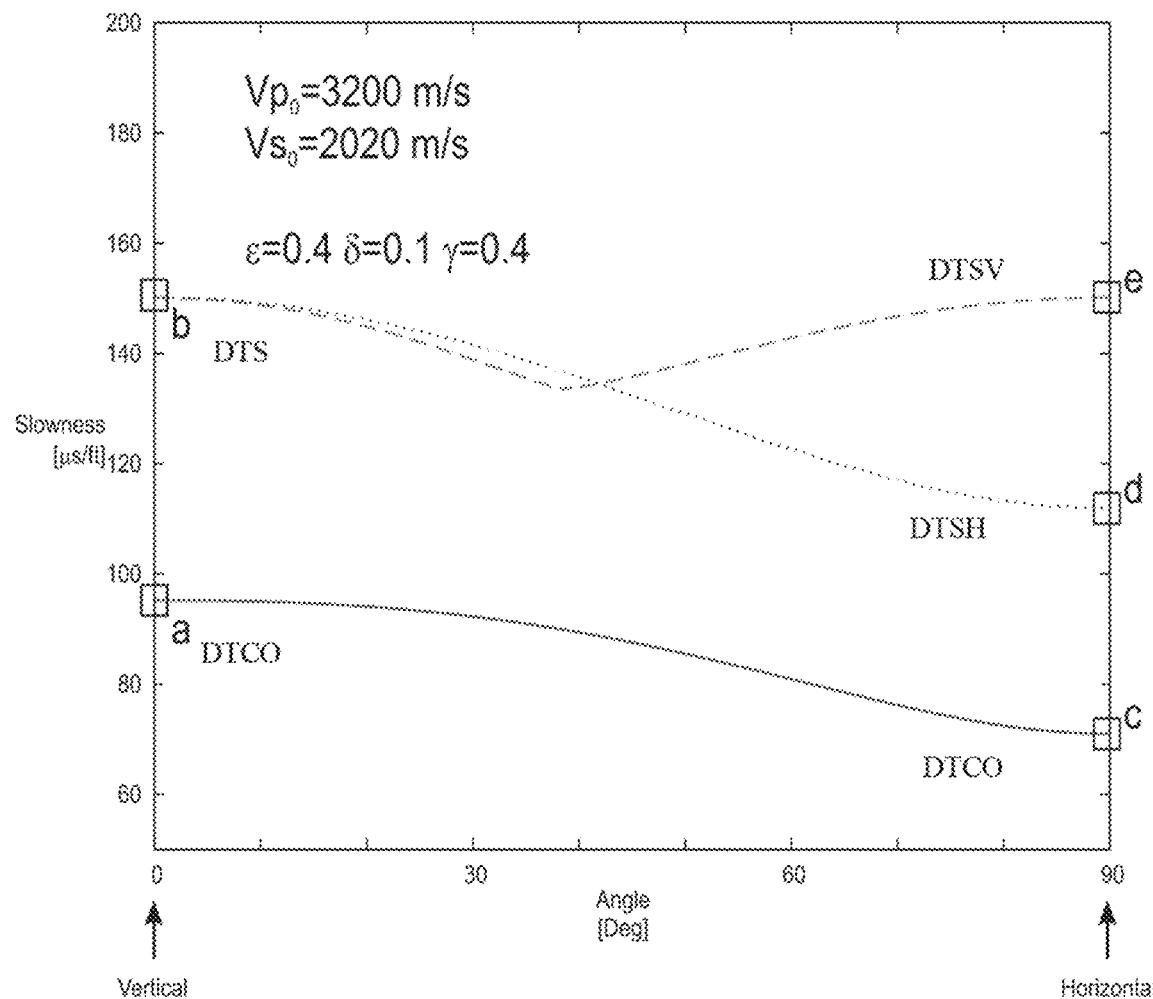
FIG. 6 illustrates one embodiment of a method of determining a VTI anisotropy along a horizontal section of a wellbore drilled into a formation.

Example1 and corresponding FIG. 6 are provided for ease of understanding. Example1 assumes an anisotropic rock, based on an organic gas shale, and the slowness variations for this anisotropic rock are plotted in the FIG. 6. In the case of the horizontal section drilled through this anisotropic rock, three slownesses may be measured with the sonic logging tool (e.g., having a cross-dipole configuration) placed downhole in the horizontal section and label "c" corresponds with the compressional slowness (DTCO), label "d" corresponds with the horizontally polarized shear slowness (DTSH), and label "e" corresponds with the vertically polarized shear slowness (DTSV). The points corresponding to labels "c", "d", and "e" may be part of the sonic log data of this horizontal section. From these slownesses, the elastic constants C11, C44, and C66 of the horizontal section may be determined using Equations 1-3.

Similarly, at 335 of FIG. 3B, the method 300 includes placing a second sonic logging tool downhole in a vertical wellbore drilled into a formation. For example, the sonic logging tool 160 may be placed downhole in the vertical wellbore 130 drilled into the formation 110.

At 340, the method 300 includes generating second seismic waves in the vertical wellbore using the second sonic logging tool placed downhole in the vertical wellbore. For example, the second seismic waves 169 may be generated in the vertical wellbore 130 using at least one source of the second sonic logging tool 160 placed downhole in the vertical wellbore 130.

At 345, the method 300 includes receiving the seismic waves at the second sonic logging tool placed in the vertical wellbore. For example, all or a subset of the generated second seismic waves 169 that reflect back from the formation 110 are received by at least one receiver of the second sonic logging tool 160.

At 350, the method 300 includes measuring the compressional slowness (DTCO) of the second seismic waves using the second sonic logging tool placed downhole in the vertical wellbore. At 355, the method 300 includes measuring the shear slowness (DTS) of the second seismic waves using the second sonic logging tool placed downhole in the vertical wellbore. For example, the second sonic logging tool 160 measures the compressional slowness (DTCO) and the shear slowness (DTS), such as measured once for each depth, for the generated second seismic waves 169 received at the second sonic logging tool 160. The second sonic logging tool 160 generates the second sonic log data 170 of the vertical wellbore 130.

Returning to Example1 and corresponding FIG. 6, in the case that the vertical wellbore is drilled through this anisotropic rock, two slownesses may be measured with the second sonic logging tool (e.g., having a cross-dipole configuration) placed downhole in the vertical wellbore and label "a" corresponds with the compressional slowness (DTCO) and label "b" corresponds with the shear slowness (DTS). In Example1, the measured compressional slowness (DTCO) of the vertical wellbore 130 is 4200 m/s. In Example1, the measured shear slowness (DTS) of the vertical wellbore 130 is 2020 m/s. The points corresponding to labels "a" and "b" may be part of the second sonic log data of this vertical wellbore.

At 360, the method 300 includes determining a vertical compressional slowness of the horizontal section corresponding to an elastic constant C33 of the horizontal section using a model with a condition. The model is built using second sonic log data and second density log data of a vertical wellbore drilled into the formation (e.g., one or more vertical wellbores drilled into the formation). The second sonic log data of the vertical wellbore comprises shear slowness (DTS) measured in the vertical wellbore and compressional slowness (DTCO) measured in the vertical wellbore (e.g., as described at 350 and 355). The condition is that the shear slowness (DTS) of the vertical wellbore is equal to the vertically polarized shear slowness (DTSV) of the horizontal section. For example, the computing system 200 may be utilized to determine the vertical compression slowness of the horizontal section 115 corresponding to the elastic constant C33 of the horizontal section 115 using the model (e.g., a regression model, a linear regression model, etc.) with the condition. The model may be built by the computing system 200 using the second sonic log data 170 of the vertical wellbore 130 measured by the second sonic logging tool 160. The condition is that the shear slowness (DTS) of the vertical wellbore 130 is equal to the vertically polarized shear slowness (DTSV) of the horizontal section 115.

Regarding the second density log data of the vertical wellbore 130, the second density log data may be measured every 6 inches along the vertical wellbore 130. The second density log data in the vertical wellbore 130 may be different than the density log data in the horizontal section 115. Similarly, the second density log data of the vertical wellbore for determining one elastic constant may be different for the other elastic constant of the vertical wellbore. FIG. 5 illustrates one embodiment of a method 500 of generating second density log data of a vertical wellbore drilled into a formation. The method 500 comprises: placing a second density logging tool downhole in the vertical wellbore at 505, generating second gamma rays using the second density logging tool placed downhole in the vertical wellbore at 510, receiving all or a subset of the second gamma rays at the second density logging tool placed downhole in the vertical wellbore and measuring the second gamma rays using the second density logging tool downhole in the vertical wellbore to generate second density log data of the vertical wellbore at 515, and generating the second density log data using the second density logging tool downhole in the vertical wellbore at 520. For example, the second density log data 190 of the vertical wellbore 130 may be generated. As another example, the computing system 200 may be utilized to improve the second density log data 190. Calibration data may be applied to the second density log data 190 using the computing system 200 and formation bulk densities may be obtained directly from the resulting calibration curves. As an example, at least one smoothing technique or other correction may also be applied to the second density log data 190 (or calibrated density log data) using the computing system 200.

Some embodiments include determining an elastic constant C33 of the vertical wellbore using the compressional slowness (DTCO) measured in the vertical wellbore and determining an elastic constant C44 of the vertical wellbore using the shear slowness (DTS) measured in the vertical wellbore. The elastic constants C33 and C44 of the vertical wellbore may be determined by the computing system 200 using the following equations:

$$C33 = \frac{\rho}{S_{DTCO}^2} \qquad \text{Equation 4}$$

$$C44 = \frac{\rho}{S_{DTS}^2} \qquad \text{Equation 5}$$

wherein ρ is the second density log data of the vertical wellbore, and wherein $S_{DTCO}$ is the compressional slowness (DTCO) measured in the vertical wellbore and $S_{DTS}$ is the shear slowness (DTS) measured in the vertical wellbore. In some embodiments, determining the vertical compressional slowness of the horizontal section corresponding to the elastic constant C33 of the horizontal section (at 360) comprises utilizing the elastic constants C33 and C44 of the vertical wellbore. Elastic constants C33 and C44 may be utilized in building the model.

Returning to 360 of FIGS. 3A-3C, from these slownesses and the second density log data of the vertical wellbore 130, the computing system 200 may determine the vertical compressional slowness of the horizontal section 115. Indeed, all of the data of the vertical wellbore may be used to train a model, which is then used in the horizontal section to predict those vertical properties along the horizontal section. Returning to Example1 and corresponding FIG. 6, labels "a" and "b" correspond to the compressional slowness (DTCO) and the shear slowness (DTS) of the vertical wellbore, respectively. In the Example1, the compressional slowness (DTCO) and the shear slowness (DTS) of the vertical wellbore are 3200 m/s and 2020 m/s, respectively. Labels "c", "d", and "e" correspond to the compressional slowness (DTCO), the horizontally polarized shear slowness (DTSH), and the vertically polarized shear slowness (DTSV) of the horizontal section, respectively. These slownesses for this anisotropic rock are plotted in FIG. 6. Note that the shear slowness (DTS) of the vertical wellbore at label "b" is equal to the vertically polarized shear slowness (DTSV) of the horizontal section at the label "e". Furthermore, FIG. 6 illustrates that the compressional slowness labelled "DTCO" and the horizontally polarized shear slowness labelled "DTSH" monotonically decrease with increasing angle. As a result, the compressional slowness (DTCO) of the horizontal section and the horizontally polarized shear slowness (DTSH) of the horizontal section are less than the corresponding slownesses of the vertical wellbore.

Figure 7:
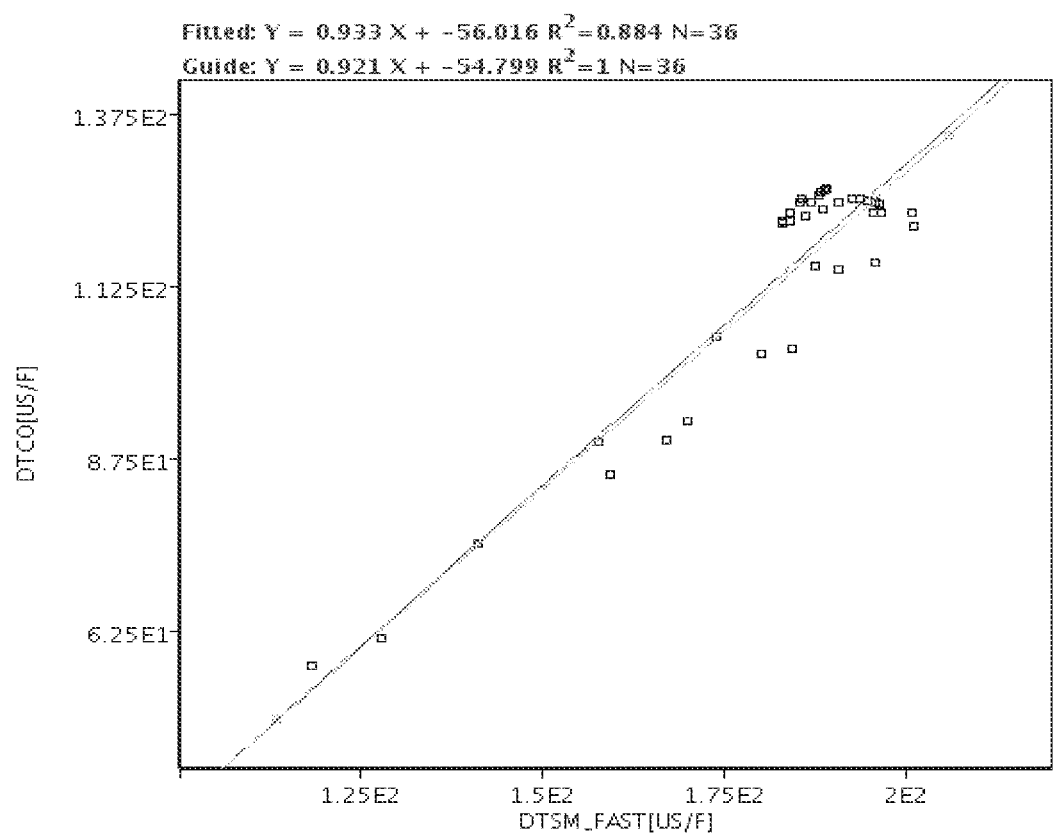
FIG. 7 illustrates an example correlation between shear and compressional slownesses in the closest vertical wellbore to the horizontal section.

FIG. 7 illustrates an example correlation between shear and compressional slownesses in the closest vertical wellbore to the horizontal section. Such correlations may be used to build predictive models for the vertical compressional slowness along the horizontal section from the measured vertically polarized shear slowness (DTSV) measured along the horizontal section. A computing system, such as the computing system 200, may combine the measured vertically polarized shear slowness (DTSV) along the horizontal section with a model predicting the vertical compressional slowness of the horizontal section from the shear slowness (DTS) of the vertical wellbore based on the second sonic log data of the vertical wellbore through the same formation. In the second sonic log data of the vertical wellbore, the associated compressional and shear data are often strongly correlated, and this strong correlation is utilized to predict one from the other (i.e., the vertical compressional slowness of the horizontal section from the shear slowness (DTS) of the vertical wellbore). Using these predicted slownesses allow for the prediction of the elastic constant C33 along the horizontal section.

For example, a crossplot may be generated using the computing system between the shear slowness (DTS) (labeled "b") and the compressional slowness (DTCO) (labeled "a") of the vertical wellbore. The crossplot may show that a strong correlation exists between these two slownesses of the vertical wellbore. The computing system may be used to model this relationship between these two slownesses of the vertical wellbore using linear regression, and the computing system may build and apply that model to the vertically polarized shear slowness (DTSV) of the horizontal section. For example, the model is applied to the vertically polarized shear slowness (DTSV) of the horizontal section such the shear slowness (DTS) of the vertical wellbore is equal to the vertically polarized shear slowness (DTSV) of the horizontal section to predict the vertical compressional slowness of the horizontal section corresponding to the elastic constant C33 of the horizontal section. Indeed, the vertical compressional slowness of the horizontal section corresponding to the elastic constant C33 of the horizontal section may be determined because of the assumption that the vertically polarized shear slowness (DTSV) measured along the horizontal section is equal to the shear slowness (DTS) that would be measured in the vertical wellbore.

Of note, in some embodiments, the model is trained on the second sonic log data of the vertical wellbore 130 (including DTCO and DTS slownesses of the vertical wellbore 130) and the second density log data of the vertical wellbore 130. This training may be done with artificial intelligence or machine learning.

At 365, the method 300 includes determining a VTI anisotropy along the horizontal section using the elastic constants C11, C44, C66, and C33 (and optionally C13 described at 375) of the horizontal section. For example, the computing system 200 may use the elastic constants C11, C44, C66, and C33 of the horizontal section 115 to determine the VTI anisotropy along the horizontal section 115 by determining at least one Thomsen anisotropy parameter. Determining at least one Thomsen anisotropy parameter is described in Thomsen, L. 1986. Weak Elastic Anisotropy. Geophysics 51 (10) 1954-1966, which is incorporated by reference herein. Returning to Example1 and corresponding FIG. 6, the computing system may be utilized to determine the Thomsen anisotropy parameters of ε=0.4, δ=0.1, and γ=0.4.

Of note, the method 300 has determined four of the five elastic constants that are utilized to define a VTI medium, namely, C11, C33, C44 and C66. From these four elastic constants, the Thomsen anisotropy parameters of ε and γ may be determined. These two Thomsen anisotropy parameters may be informative by themselves as they have been shown to be correlated with total organic carbon (TOC) and saturation in Lev Vernik and Xingzhou Liu (1997), "Velocity anisotropy in shales: A petrophysical study", GEOPHYSICS, 62(2), 521-532, which is incorporated by reference. Furthermore, empirical relationships between these parameters and static parameters may be used in geomechanical modelling, among other uses.

At 370, the method 300 includes using the determined VTI anisotropy along the horizontal section for seismic imaging, fracturing simulation, a fracturing process, or any combination thereof. For example, the computing system 200 may utilize the determined VTI anisotropy along the horizontal section 115 for seismic imaging and fracturing simulation. For example, the determined VTI anisotropy along the horizontal section 115 may be utilized to manually implement a fracturing process, adjust a fracturing process, or both. The determined VTI anisotropy along the horizontal section may be utilized in a computer implemented process, in a manual process, or in a combination of a computer implemented process and a manual process. As previously discussed, the VTI anisotropy determined according to the principles of the present disclosure may be utilized to generate a more accurate digital seismic image. The more accurate digital seismic image may be utilized in hydrocarbon exploration and hydrocarbon production for decision making and control, as well as to select completions, components, fluids, etc. As previously discussed, the VTI anisotropy determined according to the principles of the present disclosure may be utilized to improve fracturing simulation and the fracturing process. For example, in the fracture simulation, the VTI anisotropy may be used to determine a more accurate fracture geometry (e.g., height and width), thereby improving the fracture simulation. Completions, components, fluids, etc. may be selected and used in the fracturing process based on the more accurate fracture geometry, thereby improving the fracturing process. Indeed, the VTI anisotropy may be used to select parameters for the fracture simulation and then use them in the fracturing process, such as, but not limited to, stages, clusters, fluids, proppants, where to initiate fractures, etc.

Optionally, at 375, the method 300 includes determining an elastic constant C13 of the horizontal section using: (a) Stoneley mode, (b) an empirical relationship between the elastic constant C11 of the horizontal section, the elastic constant C44 of the horizontal section, the elastic constant C66 of the horizontal section, the elastic constant C33 of the horizontal section, or any combination thereof, or (c) any combination thereof. The method 300 also includes using the elastic constant C13 in determining the VTI anisotropy along the horizontal section at 365. For example, the computing system 200 may be utilized to determine the fifth elastic constant, namely, the elastic constant C13 of the horizontal section 115. The computing system 200 may use the elastic constant C13 in determining the VTI anisotropy along the horizontal section 115.

In the horizontal direction the Stoneley mode is a function of C13 in combination with the other elastic constants. However, since the other 4 elastic constants have already been estimated as described above, then C13 can be readily obtained by fixing all the other elastic constants and then estimating the C13 value that best matches the observed Stoneley mode characteristics (e.g., dispersion curve analysis). In one embodiment, Stoneley mode is in the low frequency limit (e.g., less than 1 kilohertz).

The elastic constant C13 may be determined from an analysis of the Stoneley mode as explained below. To see this, consider an analytical approximation for the Stoneley wave speed published in Norris, A. Sinha, B., 1993, Weak Elastic and the Tube Wave, Geophysics, 58(8), 1091-1098, which is incorporated by reference, and which is appropriate for weakly anisotropic VTI media. Exact but less concise formulations exist in Chi, S., Tang, X. 2006. Stoneley wave speed modeling in general anisotropic formations. GEOPHYSICS 71 (4) F67-F77, which is incorporated by reference. The low frequency Stoneley wave speed is:

$$v = \sqrt{\frac{K^*}{\rho_f}}$$ Equation 1 wherein $\rho_f$ is borehole fluid density and wherein $K^*$ is an effective Stoneley modulus given by:

$$\frac{1}{K^*} = \frac{1}{K_f} + \frac{1}{1-r}\left(\frac{1}{\mu_{fm}} + \frac{1}{\mu_t}\right)$$ Equation 2 wherein $K_f$ is a wellbore fluid bulk modulus, wherein r is volume fraction of a sonic logging tool relative to a wellbore, and wherein $\mu_{fm}$ and $\mu_t$ are effective formation and sonic logging tool moduli, respectively. The effective formation modulus is sensitive to anisotropic effects and for weak anisotropy is given by Norris, A. Sinha, B., 1993, Weak Elastic and the Tube Wave, Geophysics, 58(8), 1091-1098, which is incorporated by reference, as:

$$\mu^*(\theta) = C_{44} + 2\gamma C_{44}\cos^2\theta + \frac{1}{4}(\varepsilon - \eta)C_{33}\sin^4\theta$$ Equation 3 wherein $\theta$ is wellbore deviation, wherein $\varepsilon$, $\gamma$ are Thomsen parameters, and wherein $\eta$ is defined Norris, A. Sinha, B., 1993, Weak Elastic and the Tube Wave, Geophysics, 58(8), 1091-1098, which is incorporated by reference, to be:

$$\eta = \frac{C_{13} + 2C_{44} - C_{33}}{C_{33}}$$ Equation 4

For the horizontal section, the approximate effective formation modulus is thus:

$$\mu^* = C_{44} + \frac{1}{4}(\varepsilon - \eta)C_{33}$$ Equation 5 or, equivalently:

$$\mu^* = C_{44} + \frac{C_{11} + C_{33} - 4C_{44} - 2C_{13}}{8}$$

It can be seen that the Stoneley wave speed is sensitive to the last remaining elastic constant C13. This suggests that C13 may be estimated from the Stoneley mode measured in a horizontal section. However, it should be noted that this estimation may not be reliable if the other parameters entering in the Stoneley equation (such as the mud velocity) are inaccurate. Furthermore, the equations above describes the low frequency asymptotic solution in the case of a weakly anisotropic medium. In practice, more robust estimates for C13 may be made if the Stoneley mode's dispersion curve is inverted.

Alternatively, the remaining elastic parameter C13 of the horizontal section may be estimated using an empirical relationship between the elastic constant C11 of the horizontal section, the elastic constant C44 of the horizontal section, the elastic constant C66 of the horizontal section, the elastic constant C33 of the horizontal section, or any combination thereof. In some embodiments, the empirical relationship and which of the elastic constants to include may depend on type of the formation, density of the formation, a combination of type of the formation and density of the formation, petrophysical data or log, etc. For example, Murphy, E., Barraza, S. R., Gu, M., Gokaraju, D., Far, M., Quirein, J. 2015. New Models for Acoustic Anisotropic Interpretation in Shale. SPWLA 56th Annual Logging Symposium, 18-22 July, Long Beach, Calif., USA, which is incorporated by reference, may be utilized to estimate the remaining elastic parameter C13 using empirical relationships. For example, Greenberg, M. L. and Castagna, J. P. 1992. Shear-Wave Velocity Estimation in Porous Rocks: Theoretical Formulation, Preliminary Verification and Applications. Geophysical Prospecting. Vol. 40 (2) 195-209, which is incorporated by reference, have given empirical relations for estimating Vs from Vp in multimineralic, brine saturated rocks based on empirical, polynomial Vp-Vs relations in pure monomineralic lithologies.

In short, five elastic constants may be obtained along the length of the horizontal section, and they may be used to determine the VTI anisotropy, fluid saturation, TOC, stress conditions, etc.

Example2

In Example2, a VTI anisotropy was determined for a horizontal section using second sonic log data from the nearest vertical well located approximately 600 meters away. Per FIG. 7, the crossplot between the measured shear slowness (DTS) of the vertical wellbore and the measured compressional slowness (DTCO) of the vertical wellbore (which were measured with a second sonic logging tool placed downhole in the vertical wellbore) illustrates that a strong correlation exists between the shear slowness (DTS) of the vertical wellbore and the compressional slowness (DTCO) of the vertical wellbore as indicated by an R2 statistic of 0.88.

Figure 8:
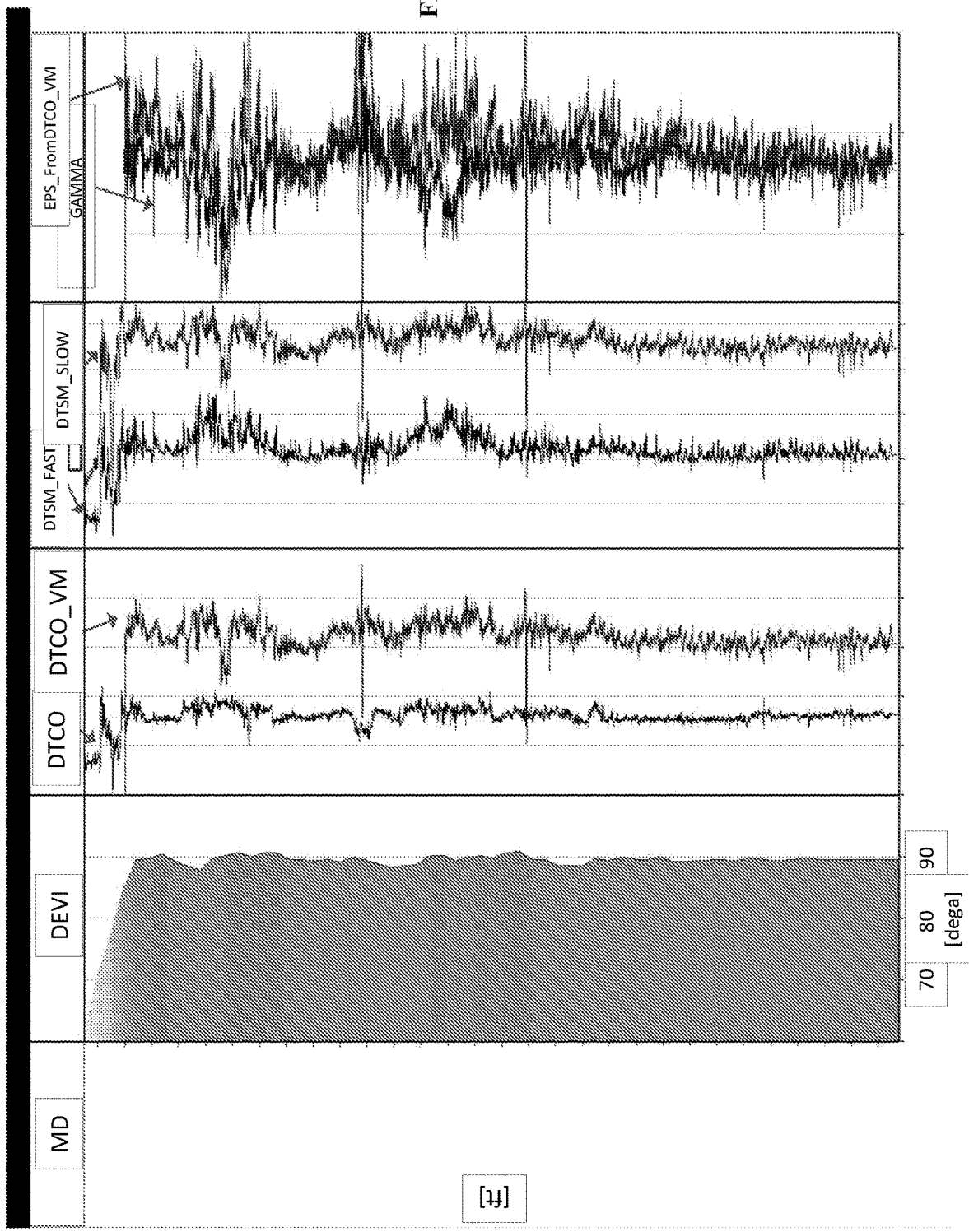
FIG. 8 illustrates an example of results.

This relation between the shear slowness (DTS) of the vertical wellbore and the compressional slowness (DTCO) of the vertical wellbore may be modelled using linear regression. This model is then applied to the measured vertically polarized shear slowness (DTSV) of the horizontal section (which was measured with a sonic logging tool placed downhole in the horizontal section) to predict the vertical compressional slowness of the horizontal section. The results are illustrated in FIG. 8. Specifically, FIG. 8 illustrates well deviation in Track 1, vertical compressional slowness along the horizontal section (Track 2, labelled DTCO_VM) from the vertically polarized shear slowness (DTSV) of the horizontal section illustrated as the DTSM_SLOW curve, from which Thomsen parameter ε is computed (illustrated as the EPS_FromDTCO_VM curve). Also, FIG. 8 illustrates the measured compressional slowness (DTCO) of the horizontal section illustrated as the DTCO curve in Track 2, the measured horizontally polarized shear slowness (DTSH) of the horizontal section illustrated as the DTSM_FAST curve, and the measured vertically polarized shear slowness (DTSV) of the horizontal section illustrated as the DTSM_SLOW curve.

The equations 1-3 may be solved and four of the five VTI elastic constants may be determined (i.e., the elastic constant C11 from the measured compressional slowness (DTCO) of the horizontal section, the elastic constant C44 from the measured vertically polarized shear slowness (DTSV) of the horizontal section, the elastic constant C66 from the measured horizontally polarized shear slowness (DTSH) of the horizontal section, and the elastic constant C33 of the horizontal section determined using the model). FIG. 8 also illustrates the Thomsen anisotropy parameters of ε and γ, which are measures of the P and S wave anisotropy, respectively.

Turning to FIG. 9, this figure illustrates one embodiment of a method of determining VTI anisotropy along a horizontal section of a wellbore drilled into a formation, referred to as a method 900, in accordance with the disclosure. The method 900 may be executed by the computing system 200 of FIG. 2. For example, each step of the method 900 may be performed by a computing system (e.g., a computer) in some embodiments.

At 905, the method 900 includes receiving sonic log data and density log data of the horizontal section of the wellbore drilled into the formation. The sonic log data of the horizontal section comprises compressional slowness (DTCO) measured in the horizontal section, vertically polarized shear slowness (DTSV) measured in the horizontal section, and horizontally polarized shear slowness (DTSH) measured in the horizontal section. For example, the computing system 200 may receive the sonic log data 155 of the horizontal section 115. The computing system 200 may also receive the density log data 185 of the horizontal section 115 (and optionally modified the density log data 185 as discussed herein).

At 910, the method 900 includes receiving second sonic log data and second density log data of a vertical wellbore drilled into the formation. The second sonic log data of the vertical wellbore comprises shear slowness (DTS) measured in the vertical wellbore and compressional slowness (DTCO) measured in the vertical wellbore. For example, the computing system 200 may receive the second sonic log data 170 of the vertical wellbore 130. The computing system 200 may also receive second density log data 190 of the vertical wellbore 130 (and optionally modified the second density log data 190 as discussed herein).

At 915, the method 900 includes determining an elastic constant C11 of the horizontal section using the compressional slowness (DTCO) and the density log data measured in the horizontal section. At 920, the method 900 includes determining an elastic constant C44 of the horizontal section using the vertically polarized shear slowness (DTSV) and the density log data measured in the horizontal section. At 925, the method 900 includes determining an elastic constant C66 of the horizontal section using the horizontally polarized shear slowness (DTSH) and the density log data measured in the horizontal section. For example, as discussed hereinabove, the computing system 200 may use the received sonic log data 155 and the density log data 185 of the horizontal section 115 in equations 1-3 to determine the elastic constants C11, C44, and C66 of the horizontal section 115.

At 930, the method 900 includes determining a vertical compressional slowness of the horizontal section corresponding to an elastic constant C33 of the horizontal section using a model with a condition. The model is built using the second sonic log data and the second density log data of the vertical wellbore drilled into the formation (e.g., one or more vertical wellbores drilled into the formation). The condition is that the shear slowness (DTS) of the vertical wellbore is equal to the vertically polarized shear slowness (DTSV) of the horizontal section. The computing system 200 may determine the vertical compressional slowness of the horizontal section 115 as discussed hereinabove. For example, the computing system 200 may utilize equations 4-5 provided hereinabove to determine the elastic constants C33 and C44 of the vertical wellbore 130. For example, as discussed hereinabove, the computing system 200 may use the received second sonic log data 170 and the second density log data 190 of the vertical wellbore 130 in equations 4-5, as well as to build the model.

At 935, the method 900 includes determining a VTI anisotropy along the horizontal section using the elastic constants C11, C44, C66, and C33 of the horizontal section. For example, the computing system 200 may determine the VTI anisotropy along the horizontal section 115 using the determined elastic constants as discussed hereinabove, such as by determining at least one Thomsen anisotropy parameter.

At 940, the method 900 includes using the determined VTI anisotropy along the horizontal section for seismic imaging, fracturing simulation, a fracturing process, or any combination thereof. For example, the computing system 200 may use the determined VTI anisotropy along the horizontal section 115 for seismic imaging. For example, the computing system 200 may use the determined VTI anisotropy along the horizontal section 115 fracturing simulation. For example, the computing system 200 may use the determined VTI anisotropy along the horizontal section 115 for a fracturing process, such as altering a computer related aspect or parameter of the fracturing process.

Optionally, at 945, the method 900 includes determining an elastic constant C13 of the horizontal section using: Stoneley mode, an empirical relationship between the elastic constant C11 of the horizontal section, the elastic constant C44 of the horizontal section, the elastic constant C66 of the horizontal section, the elastic constant C33 of the horizontal section, or any combination thereof, or any combination thereof; and using the elastic constant C13 in determining the VTI anisotropy along the horizontal section. For example, the computing system 200 may determine the elastic constant C13 of the horizontal section 115 as described hereinabove and use it to determine the VTI anisotropy along the horizontal section 115.

Indeed, the description and illustration of one or more embodiments provided in this application are not intended to limit or restrict the scope of the invention as claimed in any way. The embodiments, examples, and details provided in this disclosure are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal languages of the claims, etc. For example, those of ordinary skill in the art will appreciate that the inventive principles may be implemented using automated steps only in some embodiments, using a combination of automated and manual steps in some embodiments, or manual steps only in some embodiments. All citations referred herein are expressly incorporated herein by reference.

The invention claimed is:

1. A method of determining a vertically transverse isotropy (VTI) anisotropy along a horizontal section of a wellbore drilled into a formation, the method comprising:
    placing a sonic logging tool downhole in the horizontal section of the wellbore drilled into the formation;
    receiving seismic waves at the sonic logging tool placed downhole in the horizontal section;
    measuring compressional slowness (DTCO) of the seismic waves using the sonic logging tool placed downhole in the horizontal section and determining an elastic constant $C_{11}$ of the horizontal section using the compressional slowness (DTCO) and density log data measured in the horizontal section;
    measuring vertically polarized shear slowness (DTSV) of the seismic waves using the sonic logging tool placed downhole in the horizontal section and determining an elastic constant $C_{44}$ of the horizontal section using the vertically polarized shear slowness (DTSV) and the density log data measured in the horizontal section;
    measuring horizontally polarized shear slowness (DTSH) of the seismic waves using the sonic logging tool placed downhole in the horizontal section and determining an elastic constant $C_{66}$ of the horizontal section using the horizontally polarized shear slowness (DTSH) and the density log data measured in the horizontal section;
    determining an elastic constant C33 of the horizontal section by determining a vertical compressional slowness of the horizontal section using a model with a condition, wherein the model is built using sonic log data and second density log data of a vertical wellbore drilled into the formation, and wherein the sonic log data of the vertical wellbore comprises shear slowness (DTS) measured in the vertical wellbore and compressional slowness (DTCO) measured in the vertical wellbore, and wherein the condition is that the shear slowness (DTS) of the vertical wellbore is equal to the vertically polarized shear slowness (DTSV) of the horizontal section;
    determining a VTI anisotropy along the horizontal section using the elastic constants $C_{11}$, $C_{44}$, $C_{66}$, and $C_{33}$ of the horizontal section; and
    performing seismic imaging, fracturing simulation, a fracturing process, or any combination thereof based on the determined VTI anisotropy along the horizonal section.

2. The method of claim 1, further comprising:
    determining an elastic constant C13 of the horizontal section using:
    (a) Stoneley mode,
    (b) an empirical relationship between the elastic constant C11 of the horizontal section, the elastic constant C44 of the horizontal section, the elastic constant C66 of the horizontal section, the elastic constant C33 of the horizontal section, or any combination thereof, or
    (c) any combination thereof; and
    using the elastic constant C13 in determining the VTI anisotropy along the horizontal section.

3. The method of claim 1, wherein the elastic constants C11, C44, and C66 of the horizontal section are determined using the following equations:

$$C11 = \frac{\rho}{S_{DTCO}^2} \qquad \text{Equation 1}$$

$$C44 = \frac{\rho}{S_{DTSV}^2} \qquad \text{Equation 2}$$

$$C66 = \frac{\rho}{S_{DTSH}^2} \qquad \text{Equation 3}$$

wherein ρ is the density log data of the horizontal section, and wherein $S_{DTCO}$ is the compressional slowness (DTCO) measured in the horizontal section, $S_{DTSV}$ is the vertically polarized shear slowness (DTSV) measured in the horizontal section, and $S_{DTSH}$ is the horizontally polarized shear slowness (DTSH) measured in the horizontal section.

4. The method of claim 1, further comprising:
    placing a density logging tool downhole in the horizontal section;
    receiving gamma rays at the density logging tool placed downhole in the horizontal section and measuring the gamma rays using the density logging tool downhole in the horizontal section to generate the density log data of the horizontal section; and generating the density log data of the horizontal section.

5. The method of claim 4, further comprising generating the gamma rays using the density logging tool placed downhole in the horizontal section.

6. The method of claim 1, wherein determining VTI anisotropy along the horizontal section comprises determining at least one Thomsen anisotropy parameter.

7. The method of claim 1, further comprising generating the seismic waves using the sonic logging tool placed downhole in the horizontal section.

8. The method of claim 1, further comprising:
placing a second sonic logging tool downhole in the vertical wellbore drilled into the formation;
receiving second seismic waves at the second sonic logging tool placed in the vertical wellbore;
measuring the compressional slowness (DTCO) of the second seismic waves using the second sonic logging tool placed downhole in the vertical wellbore; and
measuring the shear slowness (DTS) of the second seismic waves using the second sonic logging tool placed downhole in the vertical wellbore.

9. The method of claim 8, further comprising generating the second seismic waves using the second sonic logging tool placed downhole in the vertical wellbore.

10. The method of claim 1, wherein building the model comprises determining elastic constants C33 and C44 of the vertical wellbore using the second density log data:

$$C33 = \frac{\rho}{S_{DTCO}^2} \qquad \text{Equation 4}$$

$$C44 = \frac{\rho}{S_{DTS}^2} \qquad \text{Equation 5}$$

wherein $\rho$ is the second density log data of the vertical wellbore, and wherein $S_{DTCO}$ is the compressional slowness (DTCO) measured in the vertical wellbore and $S_{DTS}$ is the shear slowness (DTS) measured in the vertical wellbore.

11. The method of claim 1, further comprising:
placing a second density logging tool downhole in the vertical wellbore;
receiving second gamma rays at the second density logging tool placed downhole in the vertical wellbore and measuring the second gamma rays using the second density logging tool downhole in the vertical wellbore to generate the second density log data of the vertical wellbore; and
generating the second density log data measured in the vertical wellbore.

12. The method of claim 11, further comprising generating the second gamma rays using the second density logging tool placed downhole in the vertical wellbore.

13. A computer implemented method of determining a vertically transverse isotropy (VTI) anisotropy along a horizontal section of a wellbore drilled into a formation, the method comprising:
receiving sonic log data and density log data of the horizontal section of the wellbore drilled into the formation, wherein the sonic log data comprises compressional slowness (DTCO) measured in the horizontal section, vertically polarized shear slowness (DTSV) measured in the horizontal section, and horizontally polarized shear slowness (DTSH) measured in the horizontal section;
receiving second sonic log data and second density log data of a vertical wellbore drilled into the formation, wherein the second sonic log data of the vertical wellbore comprises shear slowness (DTS) measured in the vertical wellbore and compressional slowness (DTCO) measured in the vertical wellbore;
determining an elastic constant $C_{11}$ of the horizontal section using the compressional slowness (DTCO) and the density log data measured in the horizontal section;
determining an elastic constant $C_{44}$ of the horizontal section using the vertically polarized shear slowness (DTSV) and the density log data measured in the horizontal section;
determining an elastic constant $C_{66}$ of the horizontal section using the horizontally polarized shear slowness (DTSH) and the density log data measured in the horizontal section;
determining an elastic constant $C_{33}$ of the horizontal section by determining a vertical compressional slowness of the horizontal section using a model with a condition, wherein the model is built using the second sonic log data and the second density log data of the vertical wellbore drilled into the formation, and wherein the condition is that the shear slowness (DTS) of the vertical wellbore is equal to the vertically polarized shear slowness (DTSV) of the horizontal section; and
determining a VTI anisotropy along the horizontal section using the elastic constants $C_{11}$, $C_{44}$, $C_{66}$, and $C_{33}$ of the horizontal section; and
performing seismic imaging, fracturing simulation, a fracturing process, or any combination thereof based on the determined VTI anisotropy along the horizonal section.

14. The method of claim 13, further comprising:
determining an elastic constant C13 of the horizontal section using:
(a) Stoneley mode,
(b) an empirical relationship between the elastic constant C11 of the horizontal section, the elastic constant C44 of the horizontal section, the elastic constant C66 of the horizontal section, the elastic constant C33 of the horizontal section, or any combination thereof, or
(c) any combination thereof; and
using the elastic constant C13 in determining the VTI anisotropy along the horizontal section.

15. The method of claim 13, wherein the elastic constants C11, C44, and C66 of the horizontal section are determined using the following equations:

$$C11 = \frac{\rho}{S_{DTCO}^2} \qquad \text{Equation 1}$$

$$C44 = \frac{\rho}{S_{DTSV}^2} \qquad \text{Equation 2}$$

$$C66 = \frac{\rho}{S_{DTSH}^2} \qquad \text{Equation 3}$$

wherein $\rho$ is the density log data of the horizontal section, and wherein $S_{DTCO}$ is the compressional slowness (DTCO) measured in the horizontal section, $S_{DTSV}$ is the vertically polarized shear slowness (DTSV) measured in the horizontal section, and $S_{DTSH}$ is the horizontally polarized shear slowness (DTSH) measured in the horizontal section.

16. The method of claim 13, wherein determining VTI anisotropy along the horizontal section comprises determining at least one Thomsen anisotropy parameter.

17. The method of claim 13, wherein building the model comprises determining elastic constants C33 and C44 of the vertical wellbore using the second density log data:

$$C33 = \frac{\rho}{S_{DTCO}^2} \qquad \text{Equation 4}$$

$$C44 = \frac{\rho}{S_{DTS}^2} \qquad \text{Equation 5}$$

wherein $\rho$ is the second density log data of the vertical wellbore, and wherein $S_{DTCO}$ is the compressional slowness (DTCO) measured in the vertical wellbore and $S_{DTS}$ is the shear slowness (DTS) measured in the vertical wellbore.

18. A system of determining a vertically transverse isotropy (VTI) anisotropy along a horizontal section of a wellbore drilled into a formation, the system comprising:
 a processor; and
 a memory communicatively connected to the processor and the memory storing computer-executable instructions which, when executed, cause the processor to perform:
  receiving sonic log data and density log data of the horizontal section of the wellbore drilled into the formation, wherein the sonic log data comprises compressional slowness (DTCO) measured in the horizontal section, vertically polarized shear slowness (DTSV) measured in the horizontal section, and horizontally polarized shear slowness (DTSH) measured in the horizontal section;
  receiving second sonic log data and second density log data of a vertical wellbore drilled into the formation, wherein the second sonic log data of the vertical wellbore comprises shear slowness (DTS) measured in the vertical wellbore and compressional slowness (DTCO) measured in the vertical wellbore;
 determining an elastic constant $C_{11}$ of the horizontal section using the compressional slowness (DTCO) and the density log data measured in the horizontal section;
  determining an elastic constant $C_{44}$ of the horizontal section using the vertically polarized shear slowness (DTSV) and the density log data measured in the horizontal section;
  determining an elastic constant $C_{66}$ of the horizontal section using the horizontally polarized shear slowness (DTSH) and the density log data measured in the horizontal section;
  determining an elastic constant C33 of the horizontal section by determining a vertical compressional slowness of the horizontal section using a model with a condition, wherein the model is built using the second sonic log data and the second density log data of the vertical wellbore drilled into the formation, and wherein the condition is that the shear slowness (DTS) of the vertical wellbore is equal to the vertically polarized shear slowness (DTSV) of the horizontal section;
 determining a VTI anisotropy along the horizontal section using the elastic constants $C_{11}$, $C_{44}$, $C_{66}$, and $C_{33}$ of the horizontal section; and
 performing seismic imaging, fracturing simulation, a fracturing process, or any combination thereof based on the determined VTI anisotropy along the horizonal section.

19. The system of claim 18, wherein the computer-executable instructions which, when executed, cause the processor to perform:
 determining an elastic constant C13 of the horizontal section using:
  (a) Stoneley mode,
  (b) an empirical relationship between the elastic constant C11 of the horizontal section, the elastic constant C44 of the horizontal section, the elastic constant C66 of the horizontal section, the elastic constant C33 of the horizontal section, or any combination thereof, or
  (c) any combination thereof; and
 using the elastic constant C13 in determining the VTI anisotropy along the horizontal section.

20. The system of claim 18, wherein the elastic constants C11, C44, and C66 of the horizontal section are determined using the following equations:

$$C11 = \rho/S_{DTCO}^2 \qquad \text{Equation 1}$$

$$C44 = \rho/S_{DTSV}^2 \qquad \text{Equation 2}$$

$$C66 = \rho/S_{DTSH}^2 \qquad \text{Equation 3}$$

wherein $\rho$ is the density log data of the horizontal section, and wherein $S_{DTCO}$ is the compressional slowness (DTCO) measured in the horizontal section, $S_{DTSV}$ is the vertically polarized shear slowness (DTSV) measured in the horizontal section, and $S_{DTSH}$ is the horizontally polarized shear slowness (DTSH) measured in the horizontal section.

21. The system of claim 18, wherein determining VTI anisotropy along the horizontal section comprises determining at least one Thomsen anisotropy parameter.

22. The system of claim 18, wherein building the model comprises determining elastic constants C33 and C44 of the vertical wellbore using the second density log data:

$$C33 = \frac{\rho}{S_{DTCO}^2} \qquad \text{Equation 4}$$

$$C44 = \frac{\rho}{S_{DTS}^2} \qquad \text{Equation 5}$$

wherein $\rho$ is the second density log data of the vertical wellbore, and wherein $S_{DTCO}$ is the compressional slowness (DTCO) measured in the vertical wellbore and $S_{DTS}$ is the shear slowness (DTS) measured in the vertical wellbore.

\* \* \* \* \*